United States Patent
Shimomoto

(10) Patent No.: US 9,800,318 B2
(45) Date of Patent: *Oct. 24, 2017

(54) INFORMATION PROCESSING SYSTEM FOR OPERATING DEVICES CONNECTED TO DIFFERENT NETWORKS USING SINGLE PROCESS REQUEST

(71) Applicant: RICOH COMPANY, LTD., Tokyo (JP)

(72) Inventor: Ryo Shimomoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/771,658

(22) PCT Filed: Mar. 12, 2014

(86) PCT No.: PCT/JP2014/057423
§ 371 (c)(1),
(2) Date: Aug. 31, 2015

(87) PCT Pub. No.: WO2014/142339
PCT Pub. Date: Sep. 18, 2014

(65) Prior Publication Data
US 2016/0056879 A1 Feb. 25, 2016

(30) Foreign Application Priority Data

Mar. 15, 2013 (JP) ................................. 2013-052800
Feb. 28, 2014 (JP) ................................. 2014-038695

(51) Int. Cl.
*H04W 88/04* (2009.01)
*H04B 7/14* (2006.01)
(Continued)

(52) U.S. Cl.
CPC ............... *H04B 7/14* (2013.01); *H04L 63/02* (2013.01); *H04L 67/06* (2013.01);
(Continued)

(58) Field of Classification Search
CPC ..... H04W 12/08; H04W 88/06; H04W 84/12; H04L 63/02; H04L 67/06; H04B 7/14
See application file for complete search history.

(56) References Cited

U.S. PATENT DOCUMENTS 6,026,414 A 2/2000 Anglin
2002/0174372 A1* 11/2002 Venkataraman ...... H04L 69/329
713/400

(Continued)

FOREIGN PATENT DOCUMENTS

EP 1 258 808 A2 11/2002
JP 2004-046681 2/2004
(Continued)

OTHER PUBLICATIONS

Extended European Search Report issued Dec. 21, 2015 in Patent Application No. 14763565.0.
(Continued)

*Primary Examiner* — Lakeram Jangbahadur
(74) *Attorney, Agent, or Firm* — Oblon, McClelland, Maier & Neustadt, L.L.P.

(57) ABSTRACT

An information processing system includes a relay device and first and second information processing devices. The relay device includes a reception unit that receives from a communication terminal a process request indicating first and second processes; and a terminal request transmission unit that sends the process request to the first information processing device in response to a first request, and sends an execution result of the first process and the process request to the second information processing device in response to a second request. The first information processing device includes a first process control unit that controls execution of the first process according to the process request; and a transmission unit that sends the execution result in response to the process request. The second information processing (Continued)

device includes a second process control unit that controls execution of the second process based on the execution result according to the process request.

15 Claims, 32 Drawing Sheets

(51) Int. Cl.
*H04W 12/08* (2009.01)
*H04L 29/08* (2006.01)
*H04L 29/06* (2006.01)
*H04W 84/12* (2009.01)
*H04W 88/06* (2009.01)

(52) U.S. Cl.
CPC ......... *H04L 67/1095* (2013.01); *H04W 12/08* (2013.01); *H04L 67/1097* (2013.01); *H04W 84/12* (2013.01); *H04W 88/06* (2013.01)

(56) References Cited

U.S. PATENT DOCUMENTS

| | | | | |
|---|---|---|---|---|
| 2005/0223278 A1* | 10/2005 | Saika | ................. | G06F 11/1461 714/15 |
| 2006/0277229 A1 | 12/2006 | Yoshida et al. | | |
| 2012/0110066 A1 | 5/2012 | Furuta et al. | | |
| 2013/0212163 A1 | 8/2013 | Shimomoto | | |
| 2013/0268624 A1 | 10/2013 | Yagiura | | |
| 2014/0082139 A1 | 3/2014 | Shimomoto | | |
| 2014/0280456 A1 | 9/2014 | Watanabe | | |
| 2014/0280774 A1 | 9/2014 | Kaminushi | | |

FOREIGN PATENT DOCUMENTS

| | | |
|---|---|---|
| JP | 2004-140818 | 5/2004 |
| JP | 2004-180276 | 6/2004 |
| JP | 2006-352182 | 12/2006 |
| JP | 2007-011730 | 1/2007 |
| JP | 2010-114840 | 5/2010 |
| JP | 2012-094088 | 5/2012 |
| JP | 2013-254404 | 12/2013 |
| JP | 2014-078220 | 5/2014 |
| JP | 2014-178891 | 9/2014 |
| JP | 2014-178917 | 9/2014 |
| JP | 2014-179808 | 9/2014 |
| JP | 2014-219919 | 11/2014 |
| JP | 2014-219921 | 11/2014 |

OTHER PUBLICATIONS

International Search Report Issued on Jun. 24, 2014 in PCT/JP2014/057423 filed on Mar. 12, 2014.

* cited by examiner

DEVICE REGISTRATION

PLEASE READ OUT CODE BY DEVICE TO BE REGISTERED.

FIG.10

```
{"id"       : "file_server_a",
 "address"  : "192.168.0.2"
 "contactid": "file_server_a_id"
 "activate" : "http://192.168.0.2/activate/user1/abcdefghijklmnopqrstuvwxyz"
}
```

CODE

PLEASE READ OUT WITH DEDICATED APPLICATION.

FIG.18

```
[
{"id" : "metadata" , "created_by" : "mfp2"},
{"id" : "file_server_b" , "address" : "192.168.1.3" , "contactid" : "file_server_b_id" , "type" : "file_server" ,
"accessible_devices" : ["mfp2"]},
{"id" : "mfp2" , "address" : "192.168.1.4" , "contactid" : "mfp_contact_id" , "type" : "mfp" ,
"accessible_devices" : ["file_server_b"]},
]
```

FIG.19

| FILE SERVER REGISTRATION | |
|---|---|
| DEVICE NAME | ADDRESS |
| file_server_b | 192.168.1.3 |
| file_server_c | 192.168.1.4 |
|  |  |
|  |  |
|  |  |
|  |  |

REGISTRATION  CANCEL

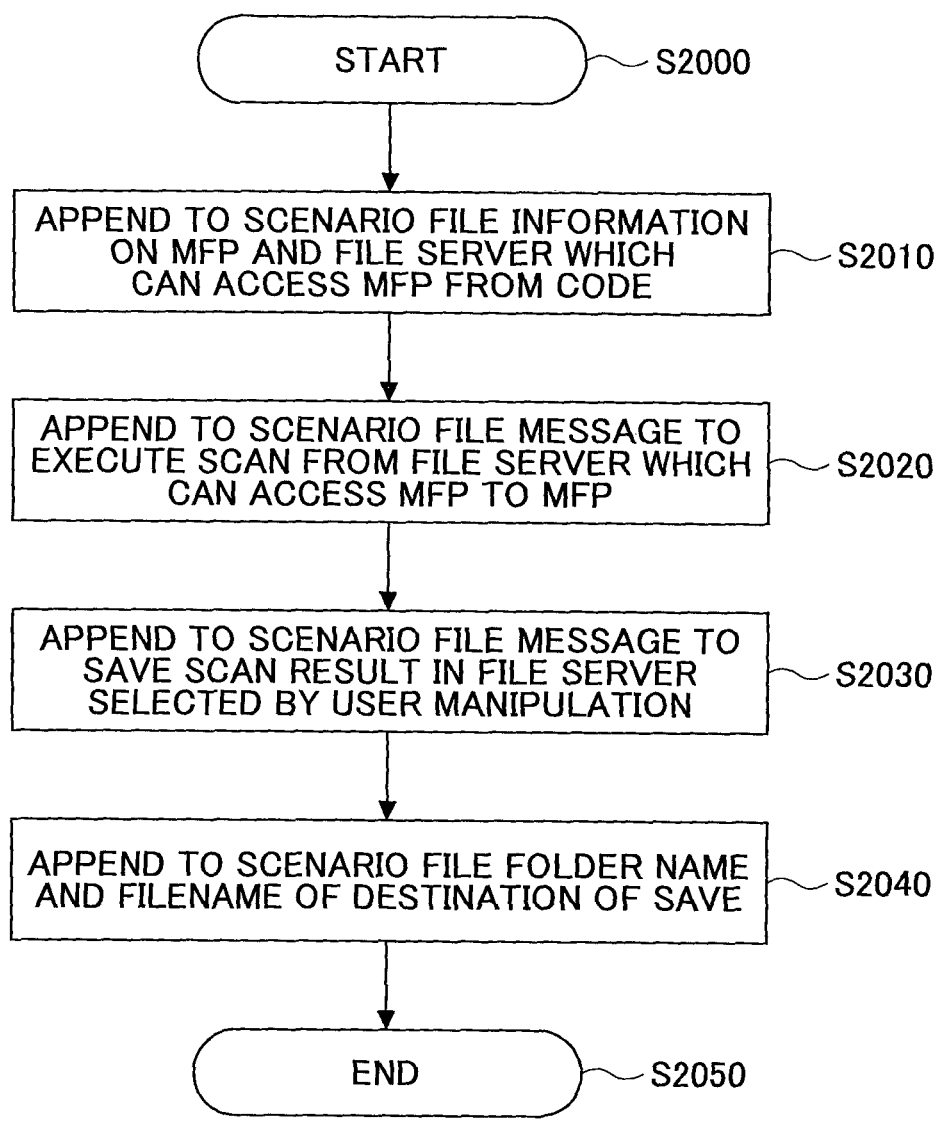

FIG.21

```
[
    "scenario" : {
        "id"          :    "scenario1",
        "messageid"   :    "random_string",
        "processes"   :    [
            {
                "id"                  :    "process1",
                "status"              :    "unexecuted",
                "source"              :    "file_server_b",
                "destination"         :    "mfp2",
                "message"     :{
                        "type"        :    "command",
                        "name"        :    "scan",
                        "setting"     :    {"type" : "pdf"},
                        "resource"    :    "resouce1"
                },
                "record"      :    {}
            },
            {
                "id"                  :    "process2",
                "status"              :    "unexecuted",
                "source"              :    "file_server_a",
                "destination"         :    "file_server_a",
                "message"     :{
                        "type"        :    "command",
                        "name"        :    "store",
                        "setting"     :    {"path" : "/user01/test.pdf"},
                        "resource"    :    "resource1"
                },
                "record"      :    {}
            }
        ]
    },
    "device" : [
        {
            "id"                  :    "file_server_a",
            "address"             :    "192.168.0.2",
            "contactid"           :    "file_server_a_id",
            "type"                :    "file_server",
            "accessible_devices"  :    ["mfp1"]
        },
        {
            "id"                  :    "file_server_b",
            "address"             :    "192.168.1.3",
            "contactid"           :    "file_server_b_id",
            "type"                :    "file_server",
            "accessible_devices"  :    ["mfp2"]
        },
        {
            "id"                  :    "mfp1",
            "address"             :    "192.168.0.3",
            "contactid"           :    "mfp_contact_id",
            "type"                :    "mfp",
            "accessible_devices"  :    ["file_server_a"]
        },
        {
            "id"                  :    "mfp2",
            "address"             :    "192.168.1.3",
            "contactid"           :    "mfp_contact_id",
            "type"                :    "mfp",
            "accessible_devices"  :    ["file_server_b"]
        }
    ],
    "resources" : [
        {
            "id"      :    "resource1",
            "type"    :    "pdf"
        }
    ]
}
```

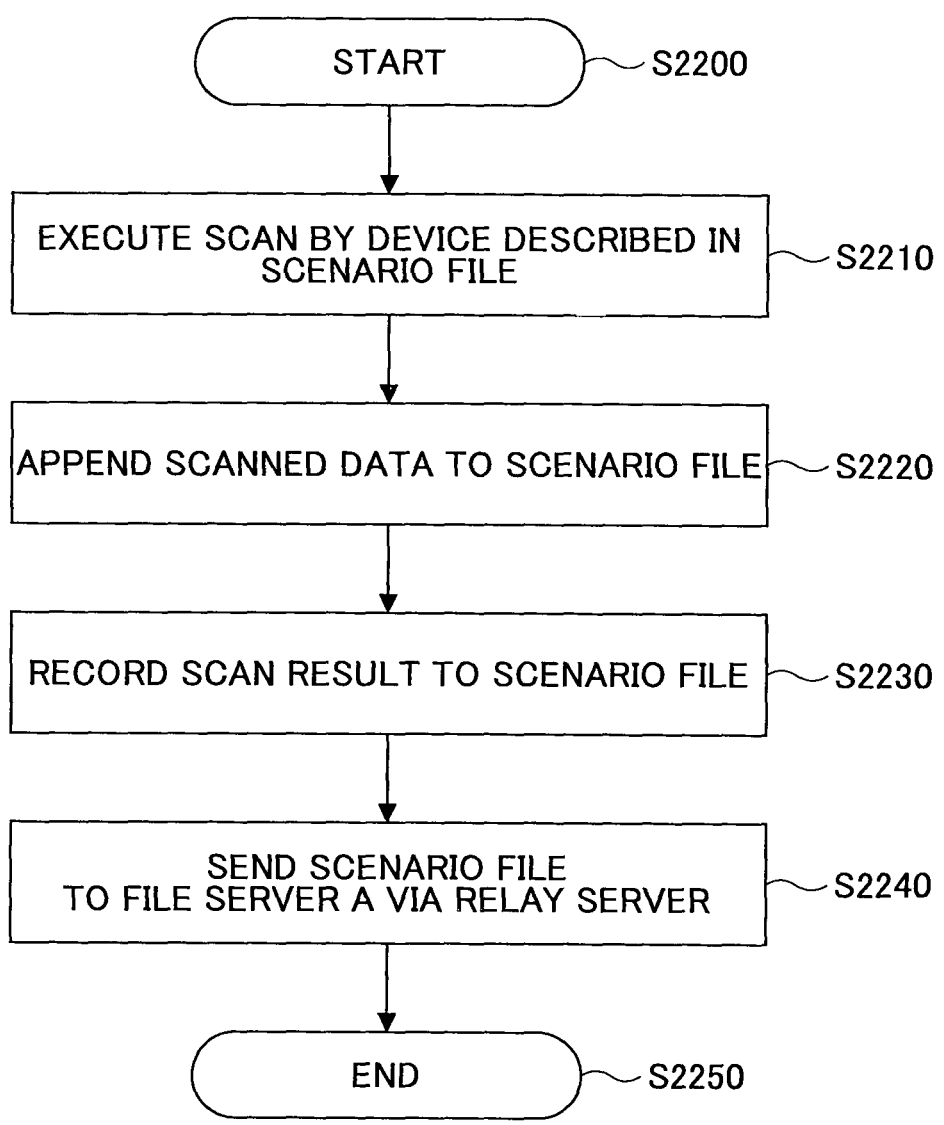

FIG.23

```
{
    "scenario" : {
        "id"         :    "scenario1",
        "messageid"  :    "random_string",
        "processes"  :    [
            {
                "id"          :    "process1",
                "status"      :    "executed",
                "source"      :    "file_server_b",
                "destination" :    "mfp2",
                "message"     :{
                    "type"     :    "command",
                    "name"     :    "scan",
                    "setting"  :    {"type" : "pdf"},
                    "resource" :    "resouce1"
                },
                "record"      :    {"result" : "success"}
            },
            {
                "id"          :    "process2",
                "status"      :    "unexecuted",
                "source"      :    "file_server_a",
                "destination" :    "file_server_a",
                "message"     :{
                    "type"     :    "command",
                    "name"     :    "store",
                    "setting"  :    {"path" : "/user01/test.pdf"},
                    "resource" :    "resource1"
                },
                "record"      :    []
            }
        ]
    },
    "device" : [
        {
            "id"                :    "file_server_a",
            "address"           :    "192.168.0.2",
            "contactid"         :    "file_server_a_id",
            "type"              :    "file_server",
            "accessible_devices":    ["mfp1"]
        },
        {
            "id"                :    "file_server_b",
            "address"           :    "192.168.1.3",
            "contactid"         :    "file_server_b_id",
            "type"              :    "file_server",
            "accessible_devices":    ["mfp2"]
        },
        {
            "id"                :    "mfp1",
            "address"           :    "192.168.0.3",
            "contactid"         :    "mfp_contact_id",
            "type"              :    "mfp",
            "accessible_devices":    ["file_server_a"]
        },
        {
            "id"                :    "mfp2",
            "address"           :    "192.168.1.3",
            "contactid"         :    "mfp_contact_id",
            "type"              :    "mfp",
            "accessible_devices":    ["file_server_b"]
        }
    ],
    "resources" : [
        {
            "id"   :    "resource1",
            "type" :    "pdf"
        }
    ]
}
!=!=!=resource_separator_start=!=!=!
!=!=!=property_start=!=!=!
{
        "id" : "resource1",
}
!=!=!=property_end=!=!=!
!=!=!=data_start=!=!=!
BINARY DATA
!=!=!=data_end=!=!=!
!=!=!=resource_separator_end=!=!=!
```

FIG.25

```
{
    "scenario" : {
        "id"          :  "scenario1",
        "messageid"   :  "random_string",
        "processes"   :  [
            {
                "id"          :           "process1",
                "status"      :           "executed",
                "source"      :           "file_server_b",
                "destination" :           "mfp2",
                "message" : {
                    "type"     :     "command",
                    "name"     :     "scan",
                    "setting"  :     {"type" : "pdf"},
                    "resource" :     "resouce1"
                },
                "record"      :           {"result" : "success"}
            },
            {
                "id"          :           "process2",
                "status"      :           "executed",
                "source"      :           "file_server_a",
                "destination" :           "file_server_a",
                "message" : {
                    "type"     :     "command",
                    "name"     :     "store",
                    "setting"  :     {"path" : "/user01/test.pdf"},
                    "resource" :     "resource1"
                },
                "record"      :           {"result" : "success"}
            }
        ]
    },
    "device" : [
        {
            "id"                :  "file_server_a",
            "address"           :  "192.168.0.2",
            "contactid"         :  "file_server_a_id",
            "type"              :  "file_server",
            "accessible_devices":  ["mfp1"]
        },
        {
            "id"                :  "file_server_b",
            "address"           :  "192.168.1.3",
            "contactid"         :  "file_server_b_id",
            "type"              :  "file_server",
            "accessible_devices":  ["mfp2"]
        },
        {
            "id"                :  "mfp1",
            "address"           :  "192.168.0.3",
            "contactid"         :  "mfp_contact_id",
            "type"              :  "mfp",
            "accessible_devices":  ["file_server_a"]
        },
        {
            "id"                :  "mfp2",
            "address"           :  "192.168.1.3",
            "contactid"         :  "mfp_contact_id",
            "type"              :  "mfp",
            "accessible_devices":  ["file_server_b"]
        }
    ],
    "resources" : [
        {
            "id"    :  "resource1",
            "type"  :  "pdf"
        }
    ]
}
```

FIG.30

```
{
    "scenario" : {
        "id"            :    "scenario1",
        "messageid"     :    "random_string",
        "processes"     :    [
            {
                "id"            :    "process1",
                "status"        :    "unexecuted",
                "source"        :    "file_server_b",
                "destination"   :    "mfp2",
                "message" :{
                    "type"      :    "command",
                    "name"      :    "scan",
                    "setting"   :    {"type" : "pdf"},
                    "resource"  :    "resource1"
                },
                "record"        :    {}
            },
            {
                "id"            :    "process2",
                "status"        :    "unexecuted",
                "source"        :    "file_server_a",
                "destination"   :    "mfp1",
                "message" :{
                    "type"      :    "command",
                    "name"      :    "output",
                    "setting"   :    {},
                    "resource"  :    "resource1"
                },
                "record"        :    {}
            }
        ]
    },
    "device" : [
        {
            "id"                 :    "file_server_a",
            "address"            :    "192.168.0.2",
            "contactid"          :    "file_server_a_id",
            "type"               :    "file_server",
            "accessible_devices" :    ["mfp1"]
        },
        {
            "id"                 :    "file_server_b",
            "address"            :    "192.168.1.3",
            "contactid"          :    "file_server_b_id",
            "type"               :    "file_server",
            "accessible_devices" :    ["mfp2"]
        },
        {
            "id"                 :    "mfp1",
            "address"            :    "192.168.0.3",
            "contactid"          :    "mfp_contact_id",
            "type"               :    "mfp",
            "accessible_devices" :    ["file_server_a"]
        },
        {
            "id"                 :    "mfp2",
            "address"            :    "192.168.1.3",
            "contactid"          :    "mfp_contact_id",
            "type"               :    "mfp",
            "accessible_devices" :    ["file_server_b"]
        }
    ],
    "resources" : [
        {
            "id"    :    "resource1",
            "type"  :    "pdf"
        }
    ]
}
```

FIG.31

```
{
    "scenario" : {
                "id"          :    "scenario1",
                "messageid"   :    "random_string",
                "processes"   :    [
                    {
                    "id"                        :    "process1",
                                "status"        :    "executed",
                                "source"        :    "file_server_b",
                                "destination"   :    "mfp2",
                                "message" :[
                                            "type"        :    "command",
                                            "name"        :    "scan",
                                            "setting"     :    {"type" : "pdf"},
                                            "resource"    :    "resouce1"
                                ],
                                "record"        :    {"result" : "success"}
                    },
                    {
                    "id"                        :    "process2",
                                "status"        :    "unexecuted",
                                "source"        :    "file_server_a",
                                "destination"   :    "mfp1",
                                "message" :[
                                            "type"        :    "command",
                                            "name"        :    "output",
                                            "setting"     :    {},
                                            "resource"    :    "resource1"
                                ],
                                "record"        :    {}
                    }
                ]
            },
            "device" : [
                {
                            "id"                    :    "file_server_a",
                            "address"               :    "192.168.0.2",
                            "contactid"             :    "file_server_a_id",
                            "type"                  :    "file_server",
                            "accessible_devices"    :    ["mfp1"]
                },
                {
                            "id"                    :    "file_server_b",
                            "address"               :    "192.168.1.3",
                            "contactid"             :    "file_server_b_id",
                            "type"                  :    "file_server",
                            "accessible_devices"    :    ["mfp2"]
                },
                {
                            "id"                    :    "mfp1",
                            "address"               :    "192.168.0.3",
                            "contactid"             :    "mfp_contact_id",
                            "type"                  :    "mfp",
                            "accessible_devices"    :    ["file_server_a"]
                },
                {
                            "id"                    :    "mfp2",
                            "address"               :    "192.168.1.3",
                            "contactid"             :    "mfp_contact_id",
                            "type"                  :    "mfp",
                            "accessible_devices"    :    ["file_server_b"]
                }
            ],
            "resources" : [
                {
                            "id"    :    "resource1",
                            "type"  :    "pdf"
                }
            ]
}
!=!=!=resource_separator_start=!=!=!
!=!=!=property_start=!=!=!
{
            "id" : "resource1",
}
!=!=!=property_end=!=!=!
!=!=!=data_start=!=!=!
BINARY DATA
!=!=!=data_end=!=!=!
!=!=!=resource_separator_end=!=!=!
```

FIG.32

```
{
    "scenario" : {
        "id"            :       "scenario1",
        "messageid"     :       "random_string",
        "processes"     :       [
            {
                "id"                    :       "process1",
                "status"                :       "executed",
                "source"                :       "file_server_b",
                "destination"           :       "mfp2",
                "message" :[
                            "type"      :       "command",
                            "name"      :       "scan",
                            "setting"   :       {"type" : "pdf"},
                            "resource"  :       "resouce1"
                },
                "record"                :       {"result" : "success"}
            },
            {
                "id"                    :       "process2",
                "status"                :       "executed",
                "source"                :       "file_server_a",
                "destination"           :       "mfp1",
                "message" :{
                            "type"      :       "command",
                            "name"      :       "output",
                            "setting"   :       {},
                            "resource"  :       "resource1"
                },
                "record"                :       {"result" : "success"}
            }
        ]
    },
    "device" : [
        {
            "id"                :       "file_server_a",
            "address"           :       "192.168.0.2",
            "contactid"         :       "file_server_a_id",
            "type"              :       "file_server",
            "accessible_devices":       ["mfp1"]
        },
        {
            "id"                :       "file_server_b",
            "address"           :       "192.168.1.3",
            "contactid"         :       "file_server_b_id",
            "type"              :       "file_server",
            "accessible_devices":       ["mfp2"]
        },
        {
            "id"                :       "mfp1",
            "address"           :       "192.168.0.3",
            "contactid"         :       "mfp_contact_id",
            "type"              :       "mfp",
            "accessible_devices":       ["file_server_a"]
        },
        {
            "id"                :       "mfp2",
            "address"           :       "192.168.1.3",
            "contactid"         :       "mfp_contact_id",
            "type"              :       "mfp",
            "accessible_devices":       ["file_server_b"]
        }
    ],
    "resources" : [
        {
            "id"    :       "resource1",
            "type"  :       "pdf"
        }
    ]
}
```

INFORMATION PROCESSING SYSTEM FOR OPERATING DEVICES CONNECTED TO DIFFERENT NETWORKS USING SINGLE PROCESS REQUEST

TECHNICAL FIELD

The present invention relates to an information processing system including a relay device and two information processing devices, an information processing method thereof and a program that makes a computer execute the method.

BACKGROUND ART

At home or in a company, aside from a global network such as the Internet, a local network is built in order to safely communicate information at home or in the company. In the local network, as security measures, for example, a firewall is introduced to prohibit a direct access to the local network from the global network. In such an environment, the local network cannot be accessed from the global network.

Recently, with the popularization of mobile terminals, such as smart phones, demands for accessing local networks inside companies from global networks and for utilizing outside company information stored inside the companies are increasing.

Patent Document 1 discloses a content output system which receives a request from a mobile terminal, and accesses an apparatus in a local network via a server (relay server) which relays the request.

CITATION LIST

Patent Literature

Patent Document 1: Japanese Published Patent Application No. 2004-046681.

DISCLOSURE OF INVENTION

Problem to be Solved by the Invention

FIG. 1 illustrates a network environment according to the related art, in which two local networks 11 and 15 are connected to a global network 10 via firewalls 12 and 16. The firewall is software or a hardware which controls communication between a specific network and the outside world, to protect the security of a device connected to the specific network.

The local network 11 is built in a business office "A", and the local network 15 is built in a business office "B". Moreover, a base station 20 of a 3G network for performing wireless communications with a mobile terminal 19 is connected to the global network 10 via a firewall 21. Furthermore, a relay server 22 is connected to the global network 10. The 3G network is a communication network for mobile phones. A file server 13 and an MFP (MultiFunction Peripheral) 14 are connected to the local network 11. A file server 17 and an MFP 18 are connected to the local network 15.

The relay server 22 relays communications between the mobile terminal 19 which performs wireless communication by the 3G network and the file server 13 or 17. Moreover, since the mobile terminal 19 does not participate in the local network 15 even when the mobile terminal 19 exists in the business office "B", the mobile terminal 19 accesses the local network 11 or 15 using the 3G network and via the global network 10 and the relay server 22.

In the above case, when a file on the file server 13 is requested to be copied to the file server 15 by using the mobile terminal 19, a process is performed according to the following procedure in the related art:

1. A request for acquiring the file is transmitted from the mobile terminal 19 to the file server 13 via the relay server 22;
2. The file server 13 transmits the file to the mobile terminal 19 via the relay server 22; and
3. The file is transmitted from the mobile terminal 19 to the file server 17 via the relay server 22, and the file is stored (saved) in the file server 17.

However, in the related art, a user is required to manipulate the mobile terminal 19 plural times for operating the plural devices connected to different networks.

In view of the above subject matter, it is a general object of at least one embodiment of the present invention to provide an information processing system, an information processing method and a program that substantially obviate one or more problems caused by the limitations and disadvantages of the related art.

Means to be Solve the Problem

According to an aspect of the invention, an information processing system includes a relay device, a first information processing device and a second information processing device. The relay device and the first and second information processing devices are connected to different networks. The relay device includes a reception unit that receives a process request sent from a communication terminal connected to the relay device, the process request indicating a first process that the first information processing device executes and a second process that the second information processing device executes based on an execution result of the first process; and a terminal request transmission unit that sends the process request received by the reception unit to the first information processing device in response to a reception of a first request sent from the first information processing device, and sends the execution result of the first process sent from the first information processing device and the process request to the second information processing device in response to a reception of a second request sent from the second information processing device. The first information processing device includes a first request transmission unit that sends the first request to the relay device; a first process control unit that controls the first information processing device so as to execute the first process according to the process request sent from the relay device in response to the reception of the first request sent from the first request transmission unit; and a transmission unit that sends to the relay device the execution result of the first process, by which the first process control unit controls the first information processing device to execute, and the process request. The second information processing device includes a second request transmission unit that sends the second request to the relay device; and a second process control unit that controls the second information processing device so as to execute the second process based on the execution result of the first process according to the process request sent from the relay device in response to the reception of the second request sent from the second request transmission unit.

According to another aspect of the invention, an information processing system includes a communication terminal, a first information processing device and a second information processing device. The communication terminal and the first and second information processing devices are connected to different networks. The communication terminal includes a transmission unit that sends to a relay device a process request indicating a first process that the first information processing device executes and a second process that the second information processing device executes based on an execution result of the first process. The first information processing device includes a first request transmission unit that sends the first request to the relay device; a first process control unit that controls the first information processing device so as to execute the first process according to the process request sent from the relay device in response to the first request sent from the first request transmission unit; and a transmission unit that sends to the relay device the execution result of the first process, by which the first process control unit controls the first information processing device to execute, and the process request. The second information processing device includes a second request transmission unit that sends the second request to the relay device; and a second process control unit that controls the second information processing device so as to execute the second process based on the execution result of the first process according to the process request sent from the relay device in response to the second request sent from the second request transmission unit.

According to yet another aspect of the invention, an information processing method which a relay device, a first information processing device and a second information processing device execute, the relay device and the first and second information processing devices being connected to different networks, includes a step of receiving by the relay device a process request sent from a communication terminal connected to the relay device, the process request indicating a first process that the first information processing device executes and a second process that the second information processing device executes based on an execution result of the first process; a step of sending by the first information processing device the first request to the relay device; a step of sending by the relay device the process request to the first information processing device in response to a reception of a first request sent from the first information processing device; a step of controlling, by the first information processing device, the first information processing device so as to execute the first process according to the process request sent from the relay device in response to the sent first request; a step of sending the execution result of the executed first process and the process request to the relay device; a step of sending by the second information processing device the second request to the relay device; a step of sending by the relay device the execution result of the first process sent from the first information processing device and the process request to the second information processing device in response to a reception of the second request sent from the second information processing device; and a step of controlling, by the second information processing device, the second information processing device so as to execute the second process based on the execution result of the first process according to the process request sent from the relay device in response to the sent second request.

Effects of the Present Invention

According to the present invention, an information processing system, an information processing method and a program, which enable the operation of the plural devices connected to different networks by a single operation of a user, are provided.

BRIEF DESCRIPTION OF DRAWINGS

FIG. 10 is a diagram illustrating an example of a content represented by the code shown in FIG. 4;

FIG. 18 is a diagram illustrating an example of the contents represented by the code shown in FIG. 17;

FIG. 19 is a diagram illustrating an example of a screen for manually inputting an accessible file server according to the present embodiment;

FIG. 20 is a flowchart illustrating an example of a process of generating a scenario file as a terminal request according to the present embodiment;

FIG. 21 is a diagram illustrating an example of the scenario file generated by the process shown in FIG. 20;

FIG. 22 is a flowchart illustrating an example of a process after the file server "B" acquires the scenario file according to the present embodiment;

FIG. 23 is a diagram illustrating an example of the scenario file after the process shown in FIG. 22;

FIG. 25 is a diagram illustrating an example of the scenario file after the process shown in FIG. 24;

FIG. 30 is a diagram illustrating an example of a scenario file generated after the start button is pressed in the screen shown in FIG. 29;

FIG. 31 is a diagram illustrating an example of the scenario file after the MFP2 reads out the image according to the present embodiment; and FIG. 32 is a diagram illustrating an example of the scenario file after a printing is performed at the MFP1.

BEST MODE FOR CARRYING OUT THE INVENTION

Although the present invention has been described with reference to embodiments, the present invention is not limited to these embodiments, but various variations and modifications may be made without departing from the scope of the invention as set forth in the accompanying claims.

Figure 2:
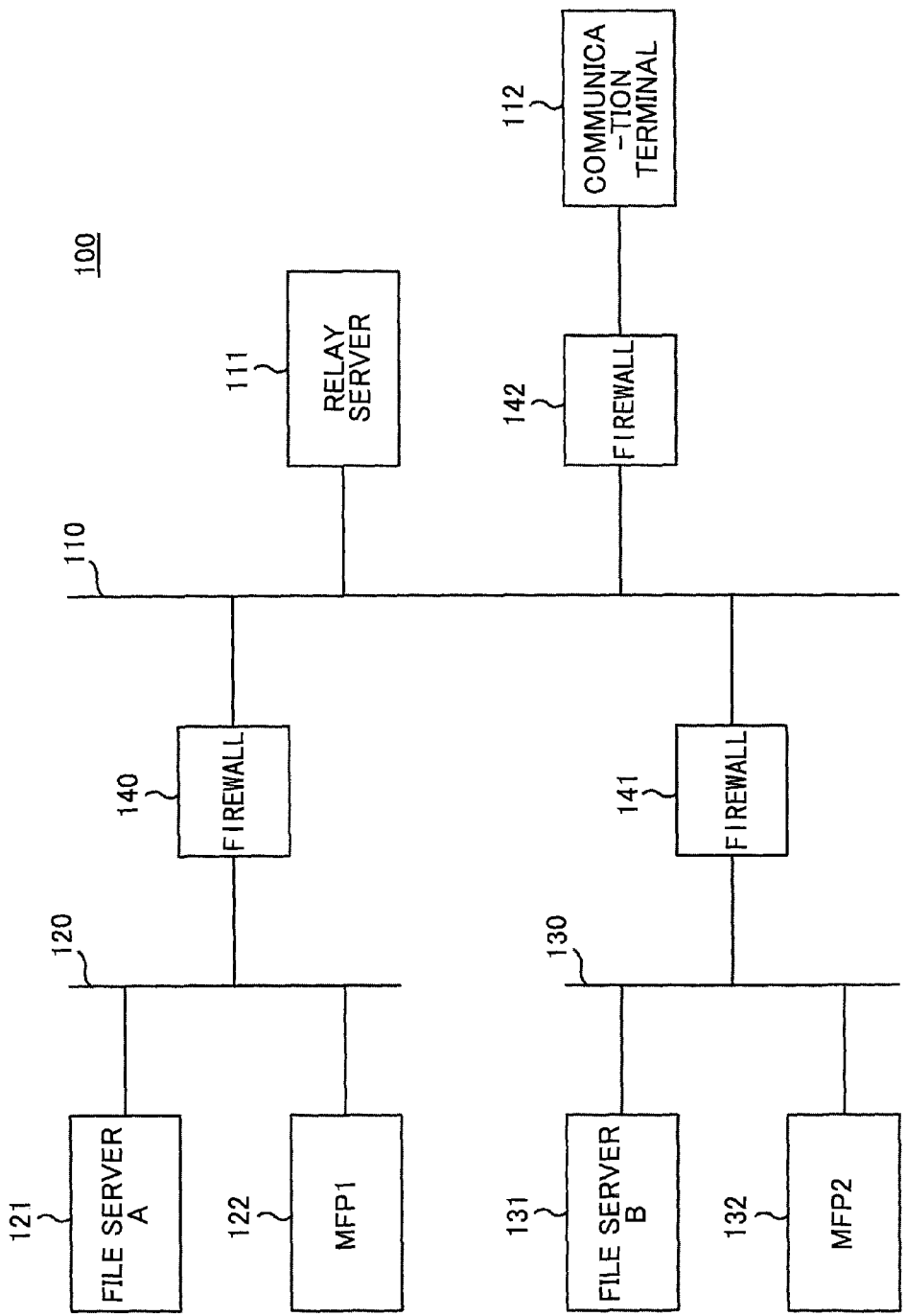
FIG. 2 is a diagram illustrating an example of a configuration of an information processing system according to the present embodiment.

FIG. 2 is a diagram illustrating an example of a configuration of an information processing system according to the present embodiment. The information processing system 100 shown in FIG. 2 includes a global network 110, and different plural local networks 120 and 130. The global network 110 is a wide area communication network such as the Internet and a network which can be accessed freely from other networks. The local networks 120 and 130 are localized networks such as LANs (Local Area Networks) and access from other networks is restricted.

To the global network 110 a relay server 111 as a relay device and a communication terminal 112 are connected. The relay server 111 and the communication terminal 112 are connected to the global network 110 wired or wirelessly. In the case of connecting wirelessly, the relay server 111 and the communication terminal 112 can be connected to the global network 110 by using a 3G network, wireless LAN, the Bluetooth (registered Trademark) or the like.

To the one local network 120 a file server A 121 as an information processing device which can communicate with the relay server 111 is connected. Moreover, to the local network 120 an MFP1 122 as a device (electronic device) is also connected.

To the other local network 130, a file server B 131 having the same configuration as above is connected. Also to the local network 130, an MFP2 132 as a device is connected. Furthermore, in the case where some other local networks exist, a file server having the same configuration is connected to each of the local networks. To the local network, a device other than the file server may be connected and may not be connected. Moreover, the number of the devices connected to the single local network is not limited to one. Plural devices may be connected to the single local network.

The information processing system 100 includes plural information processing devices such as the relay server 111, the communication terminal 112, or the plural file servers as described above. However, the information processing system 100 may further include the plural devices such as the MFP1 122 and MFP2 132 as described above.

Each of the local networks 120 and 130 is connected to the global network 110 via a communication restriction device such as a firewall 140, 141 or the like, for example, in order to restrict an access from other network. Moreover, in the 3G network to which the communication terminal 112 is connected, a firewall 142 is provided. The communication terminal 112 is connected to the global network 110 via the firewall 142.

In the present embodiment, for a device, the MFP1 122 or MFP2 132 as the image forming apparatus is used. But, a device other than the MFP, e.g. a scanner device, a monitor, an electronic blackboard, a projector or the like as an image readout device may be used. Moreover, for the device, a printer as a print device, a facsimile device, a PC, a server device or the like may be used.

Figure 3:
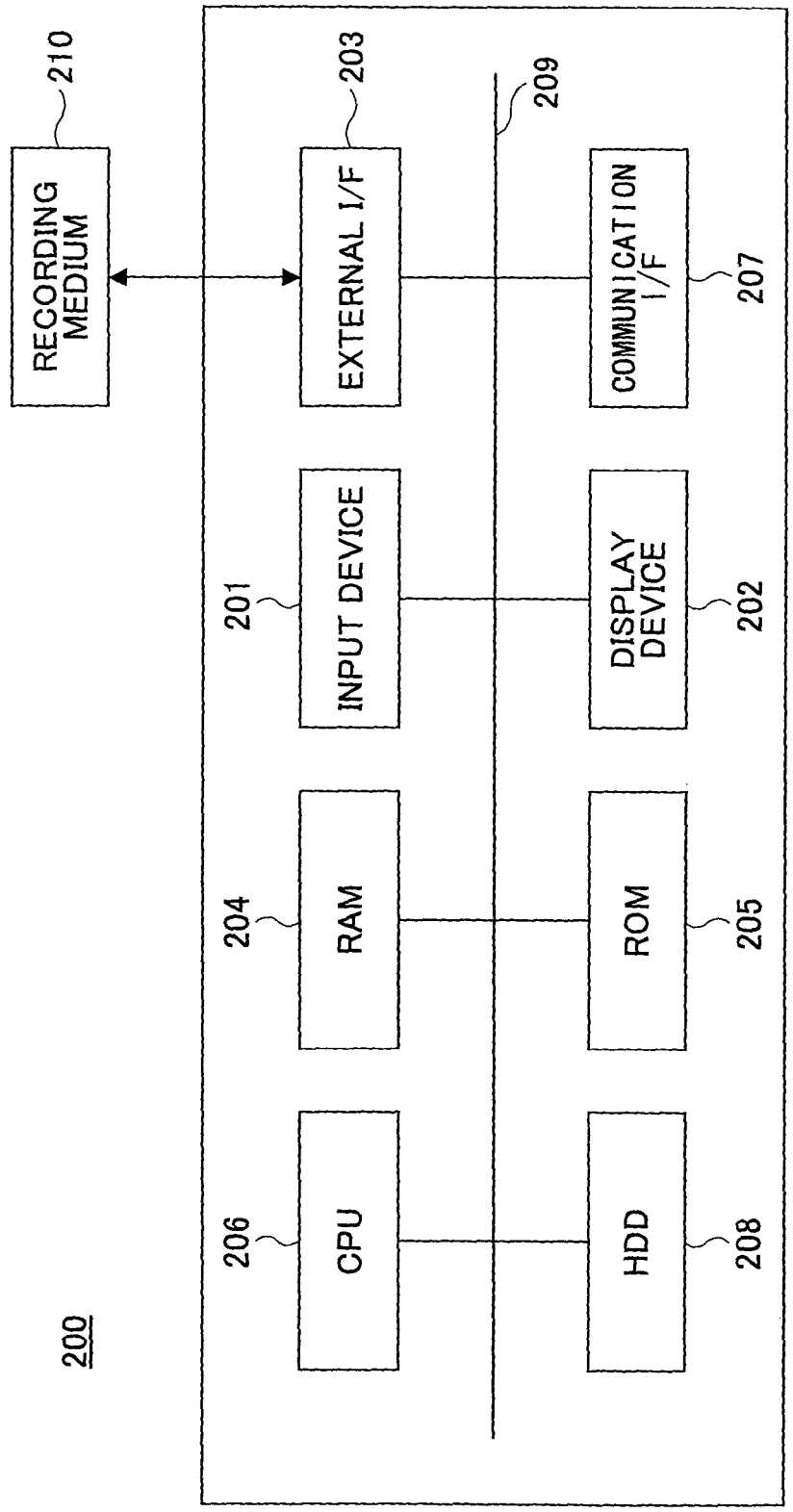
FIG. 3 is a diagram illustrating an example of a hardware configuration of a computer included in a relay server or the like shown in FIG. 2.

With reference to FIG. 3, a hardware configuration of the relay server 111, the plural file server A 121 and file server B 131 will be explained. These servers are realized by computers having the same hardware configuration, and in the present embodiment, as the computer 200, the hardware configuration will be explained.

The computer 200 includes an input device 201, a display device 202, an external I/F 203, a RAM 204, a ROM 205, a CPU 206, a communication I/F 207 and a HDD 208, which are connected to each other via a bus 209. Meanwhile, the input device 201 and the display device 202 may be always connected to the bus 209, or may be connected when it is necessary.

The input device 201 includes a keyboard, a mouse, a touch panel or the like, and used for inputting respective control signals to the computer 200. The display device 202 includes a display or the like, and displays an execution result of the process performed by the computer 200. The communication I/F 207 is an interface for connecting the computer 200 to a network. The computer 200 can perform communication with other devices via the communication I/F 207.

The HDD 208 is a non-volatile storage device for storing various programs or data. The stored program includes an OS (operating system) which is a basic software for controlling the entire computer 200, an application software which provides various functions on the OS, or the like. Moreover, the HDD 208 manages the stored program or data by using a predetermined file system or a database (DB).

The external I/F 203 is an interface to an external device. The external device includes a recording medium 210 or the like. The computer 200 reads out from or writes to the recording medium 210 via the external I/F 203. The recording medium 210 includes a flexible disk, a CD-ROM (compact disk read-only memory), a DVD (digital versatile disk), a SD (secure digital) card memory, a USB (universal serial bus) memory or the like.

The ROM 205 is a non-volatile semiconductor memory (storage device) which can hold a program or data if the power is off. The ROM 205 stores a BIOS which is executed during the computer's start-up process, a program or data for an OS configuration, a network configuration, or the like. The RAM 204 is a volatile semiconductor memory which temporarily holds a program or data.

The CPU 206 is an arithmetic device for realizing a control of the entire computer 200 and a function by reading out a program or data from the storage device the ROM 205 or the HDD 208 or the like on the RAM 204, and executing the process. By employing such hardware configurations various processes, which will be described later, can be realized.

Figure 4:
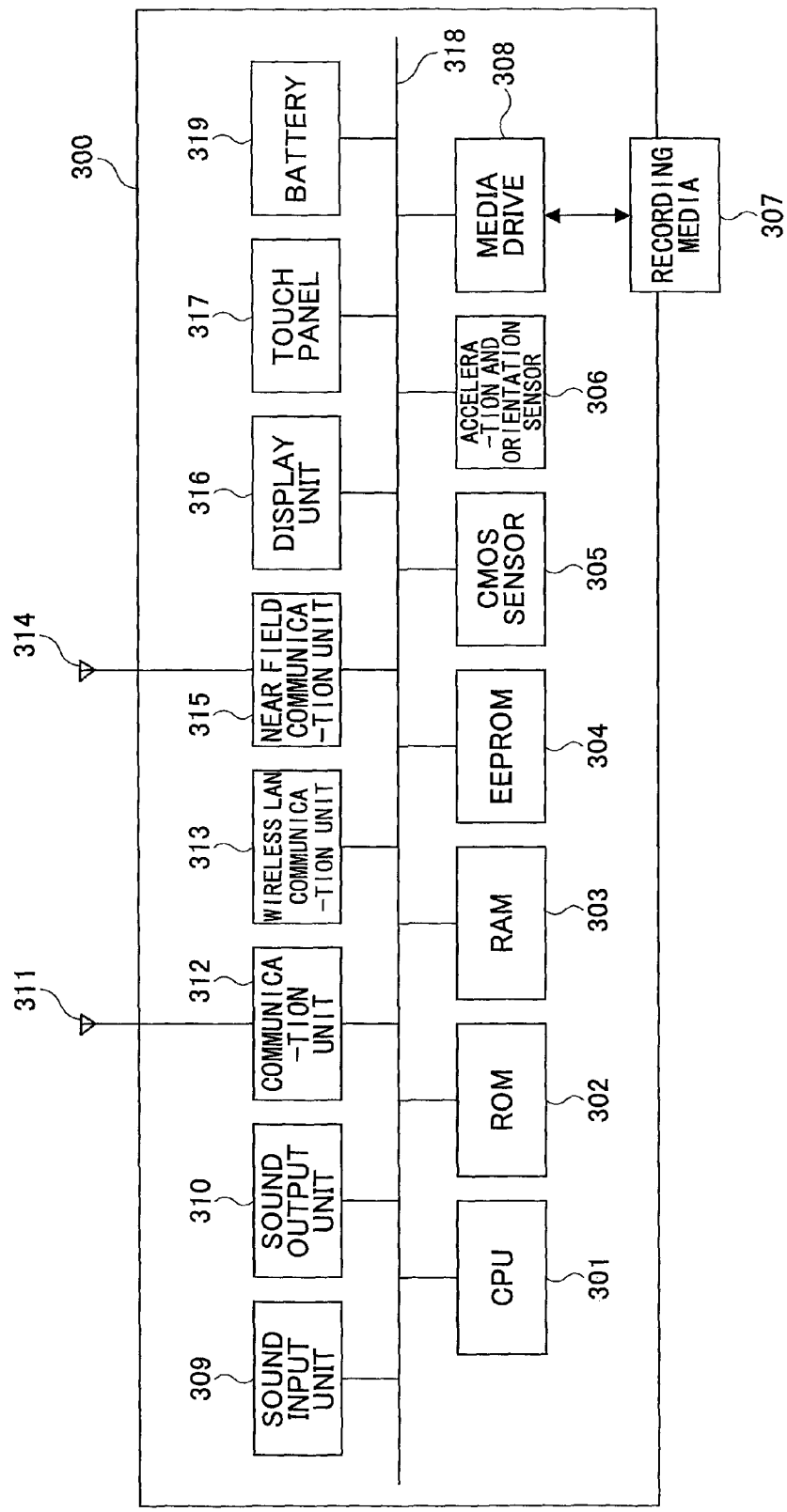
FIG. 4 is a diagram illustrating an example of a hardware configuration of a communication terminal shown in FIG. 2.

Next, with reference to FIG. 4, a hardware configuration of the communication terminal 112 will be explained. The communication terminal 112 will be referred to as a communication terminal 300. The communication terminal 300 includes a CPU 301 which controls an operation of the entire communication terminal 300. Moreover, the communication terminal 300 includes a ROM 302 for storing a basic input/output program, a RAM 303 used as a work area by the CPU 301, and an EEPROM 304 which reads out data or writes data according to the control by the CPU 301.

The communication terminal 300 includes a CMOS (complementary Metal-Oxide Semiconductor) sensor 305 which images an object according to the control by the CPU 301 and acquires image data, and an acceleration and orientation sensor 306 including an electronic magnetic compass for detecting earth magnetism, a gyrocompass, an acceleration sensor or the like. Moreover, the communication terminal 300 includes a media drive 308 that controls reading out data from or writing data to a recording medium 307 such as a flash memory. In FIG. 4, the recording medium 307, from which recorded data are read out or to which new data are written according to the control by the media drive 308, is detachable.

Figure 1:
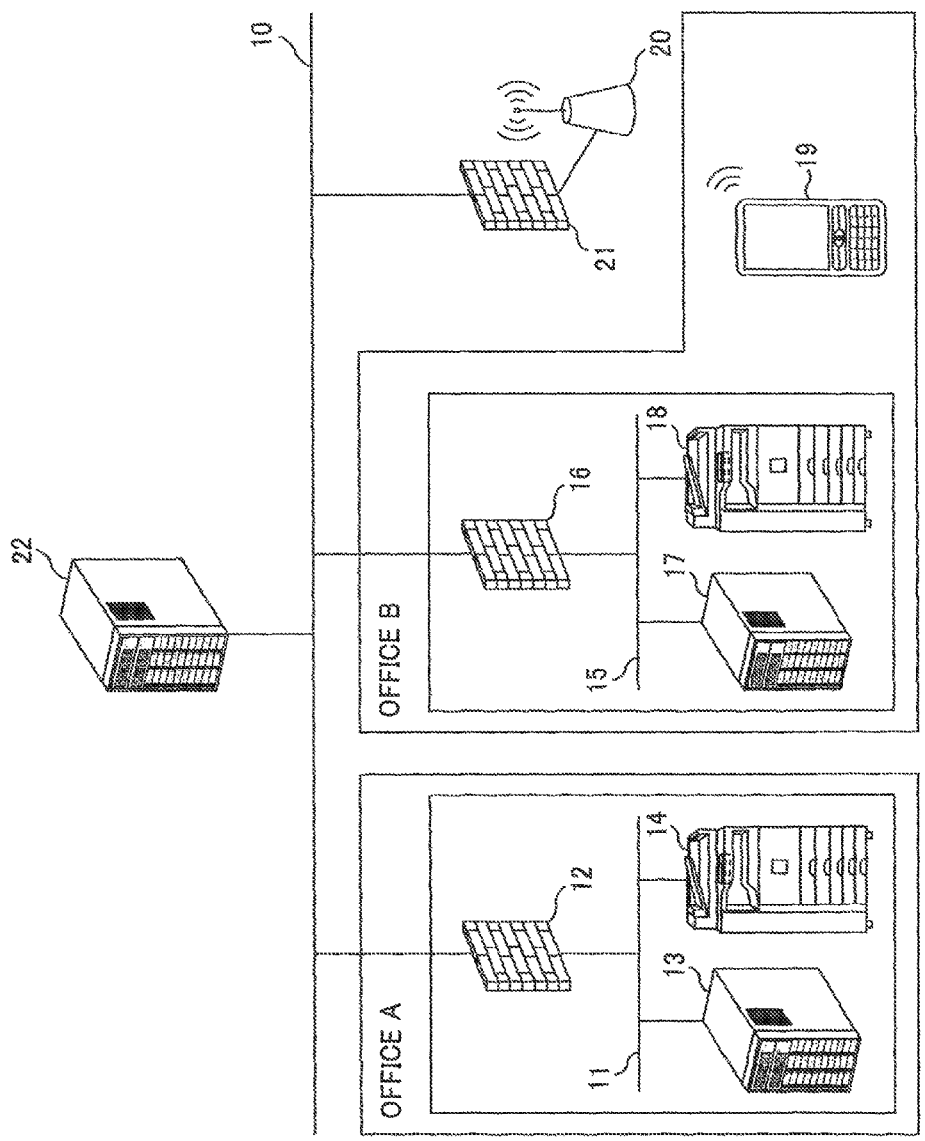
FIG. 1 is a diagram illustrating an example of a configuration of a system in which a file is uploaded to two devices according to the related art.

In the EEPROM 304, the OS executed by the CPU 301, association information necessary for the network configuration or the like is stored. The application (cooperation processing application) for executing the cooperation processing service provided by the information processing system 100, shown in FIG. 1, is stored in the EEPROM 304 or the recording medium 307. The CMOS sensor 305 is a charge coupled device, which converts a light into a charge and computerizes the image of the object. If it can image the object, it is not limited to the CMOS sensor, and a CCD (Charge Coupled Device) sensor may be employed.

The communication terminal 300 includes a sound input unit 309 for converting a sound into a sound signal, a sound output unit 310 for converting the sound signal into a sound, an antenna 311, and a communication unit 312 that communicates with a base station device by a wireless communication signal by using the antenna 311. The communication terminal 300 further includes a wireless LAN (Local Area Network) communication unit 313 that performs a wireless LAN communication with an access point in conformity with the IEEE 802.11 standard, an antenna for near field communication 314, a near field communication unit that performs a near field communication by using the antenna for near field communication 314. Moreover, communication terminal 300 includes a display unit 316 of a liquid crystal, an organic electro luminescence (EL) or the like that displays the image of the object or various icons or the like, a touch panel 317 place on the display unit 316 including a pressure sensitive panel or an electrostatic panel that detects a position on the display unit 316 by contact of a finger or a touch pen.

The communication terminal 300 includes a bus line 318 an address bus, a data bus or the like for connecting electrically the respective functional parts, as stated above, and a dedicated battery 319. Accordingly, the communication terminal 300 is driven by the dedicated battery 319. The sound input unit 309 includes a microphone for inputting a sound, and the sound output unit 310 includes a speaker for outputting the sound. The communication terminal 300, by employing the above configuration, can realize various processes as stated later.

Figure 5:
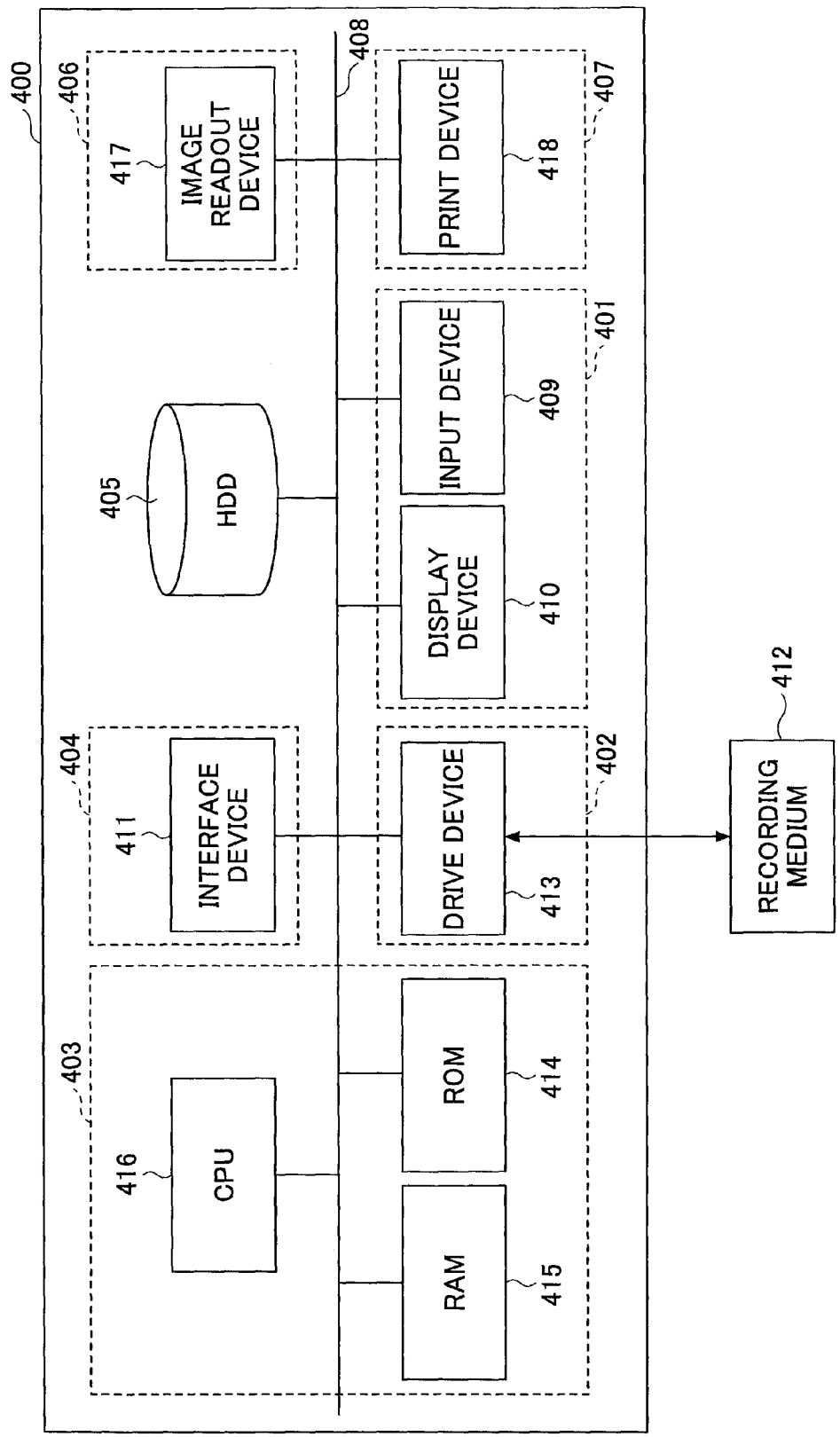
FIG. 5 is a diagram illustrating an example of a hardware configuration of an MFP shown in FIG. 2.

Finally, with reference to FIG. 5, a hardware configuration of the MFPs 122, 132 will be explained. These MFPs 122, 132 are realized by the same hardware configuration, and in the present embodiment, the hardware configuration will be explained as an image forming apparatus 400.

The image forming apparatus 400 includes a control panel 401, a storage media I/F 402, a controller 403, a data communication I/F 404, a HDD 405, a scanner 406, a plotter 407. The above units are connected to each other via the bus 408.

The control panel 401 includes an input device 409 and a display device 410. The input device 409 includes hardware keys or the like, and used for inputting respective control signals to the image forming apparatus 400. The display device 410 includes a display or the like, and, for example, displays various kinds of information on an image forming operation.

The data communication I/F 404 includes an interface device 411. The interface device 411 is an interface that connects the image forming apparatus 400 to a data transmission path such as the network. The HDD stores various kinds of data including received document data or read out image data handled in the image forming apparatus 400. The HDD 405 manages the various kinds of stored data by using a predetermined file system or a database.

The various kinds of data stored in the HDD 405 includes electronic data recorded by an external device such as a smartphone, a digital camera or the like, for example. Such data are provided to the image forming apparatus 400 by the recording medium 412 such as an SD card memory, or by uploading via the network or the like as the data transmission path. The recording medium 412 is set in the drive device 413 with which the recording medium I/F is provided. The various kinds of data recorded in the recording medium 412 are stored in the HDD 405 via the drive device 413.

The controller 403 includes a ROM 414, a RAM 415 and a CPU 416. The ROM 414 stores a program executed during a start-up process of the image forming apparatus 400 and various kinds of data. The RAM 415 temporarily holds the various kinds of program and the data read out from the ROM 414 or the HDD 405. The CPU 416 executes the program temporarily held in the RAM 415. When the controller 403 receives print data via the data communication I/F 404, for example, the controller 403 executes a program (PDL parser) that can interpret a PDL (Page Description Language) read out from the ROM 414 onto the RAM 415, interprets the print data and generates a bitmap image.

The scanner 406 includes an image readout device (scanner engine) 417. The image readout device 417 optically reads out a manuscript arranged on the readout surface, generates an image data, and outputs the image data. The plotter 407 includes a print device (plotter engine) 418. The print device 418, for example, prints the bitmap image on a recording paper by using the electrophotographic process method. By employing the above configuration, the image forming apparatus 400 can realize plural functions such as a copier, a printer, a facsimile device, a scanner and the like.

Figure 6:
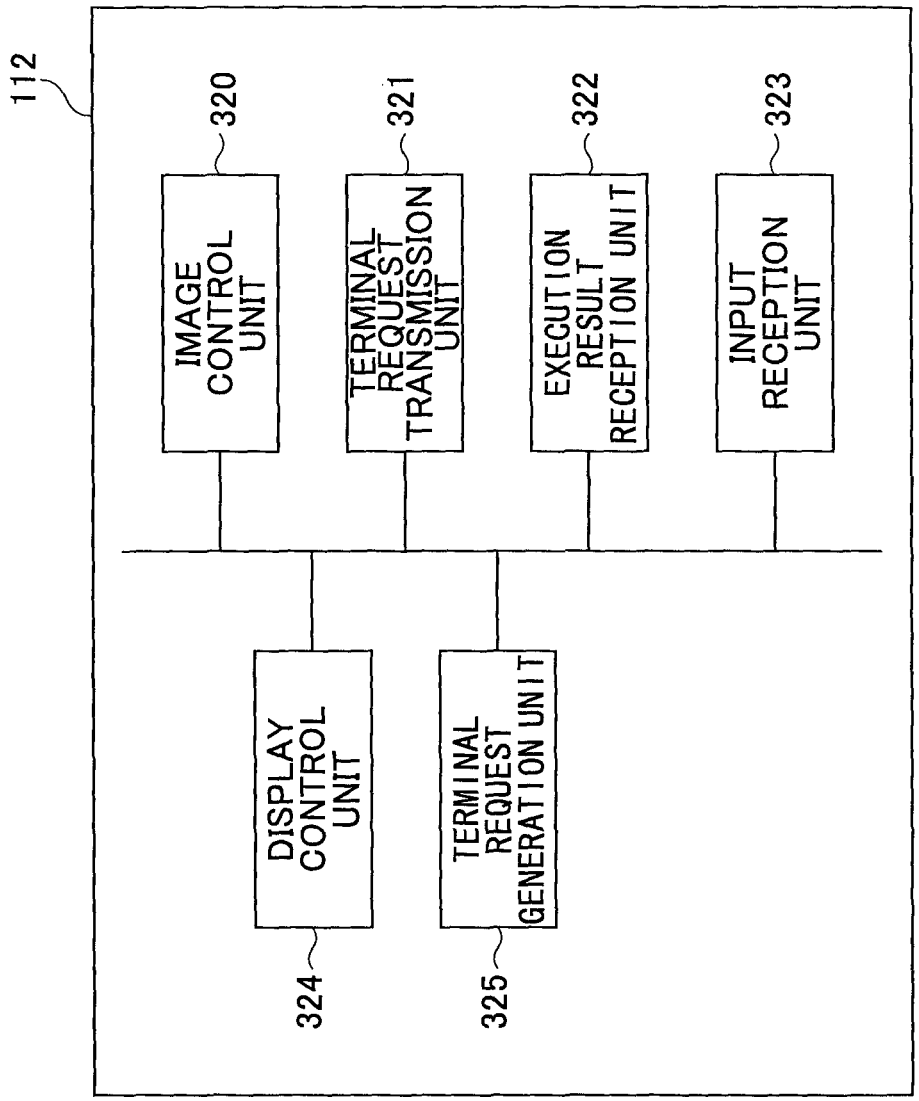
FIG. 6 is a function block diagram of the communication terminal shown in FIG. 2.

Next, with reference to FIGS. 6 to 8 functions with which the respective devices are provided and processes executed by the functions will be explained. FIG. 6 is a functional block diagram of the communication terminal 112. The communication terminal 112 is provided with an image control unit 320, a terminal request transmission unit 321, an execution result reception unit 322, an input reception unit 323, a display control unit 324 and a terminal request generation unit 325 as the functional units. The respective functions are realized by executing the program stored in the storage device, such as the ROM, the RAM, the HDD or the like, at the CPU with which the communication terminal 112 is provided.

The image control unit 320 controls the camera (CMOS) with which the communication terminal 112 is provided, to image the object and to generate image data. The input reception unit 323 controls the touch panel to receive an input instruction from the user. The display control unit 324 controls the display unit to display information to the user. The terminal request generation unit 325 generates a terminal request to require an operation to an external device. The terminal request transmission unit 321 sends the terminal request generated by the terminal request generation unit 325 to an external device connected to the communication terminal 112.

The terminal request sent by the terminal request transmission unit 321 is assumed to include a process request indicating the process contents to be executed by the respective file server A 121 and file server B 131, an order of the processes and the device information of the file servers 121 131 associated with the respective process contents.

The process content is, for example, reading out (scanning) an image, outputting and storing electronic data such as image data, voice data, picture data, document data, transmitting/receiving facsimile data, or transmitting/receiving mail data. The terminal request includes a process request indicating an order of two processes, for example, scanning as the first process and outputting the image data as the second process, and process contents. Accordingly, the process contents are found to be content that at first the scanning is performed and next, the acquired image data is output.

As the device information, a file server name may be included as one of device identification information in order to identify the file server A 121 or file server B 131. As the file server name, a configuration including a character, a symbol, a numeral, combinations of them, or the like may be used. Moreover, as the device information, an address of the file server A 121 or file server B 131 may be included. As the address, as long as it is an address necessary for accessing the file servers 121 and 131, any address may be used. For example, an IP (Internet Protocol) address may be used.

As the device information, the file server name as above may be used, however, a file server identifier (contact ID) as different device identification information from it may be included. As the contact ID, a configuration including a character, a symbol a numeral, combinations of them, or the like may also be used. Meanwhile, the contact ID is used when a terminal request cannot be transmitted directly from the file server A 121 to the file server B 131, but is transmitted via the relay server 111.

Moreover, as the device information, a type of the device, a device name of an accessible device may be included. The type of device is a file server, a printer server, a PC (personal computing), an MFP, or the like. The file servers 121 and 131 are assumed to be the file servers. The accessible device, in the case where the access is not restricted, for the file server A 121, is the MFP1 122 connected to the same local network 120. Moreover, for the file server B 131, the accessible device is the MFP2 132 connected to the same local network 130. If there is an other device connected to the same local network, the device is included in the accessible devices.

Moreover, in the terminal request, an address of the communication terminal 112 may be further included. This is for the purpose that a result of executing a process for the terminal request from an information processing device, such as the file server A 121, a file server B 131, or the like is returned to the communication terminal 112. As the address, the IP address may be used.

Figure 7:
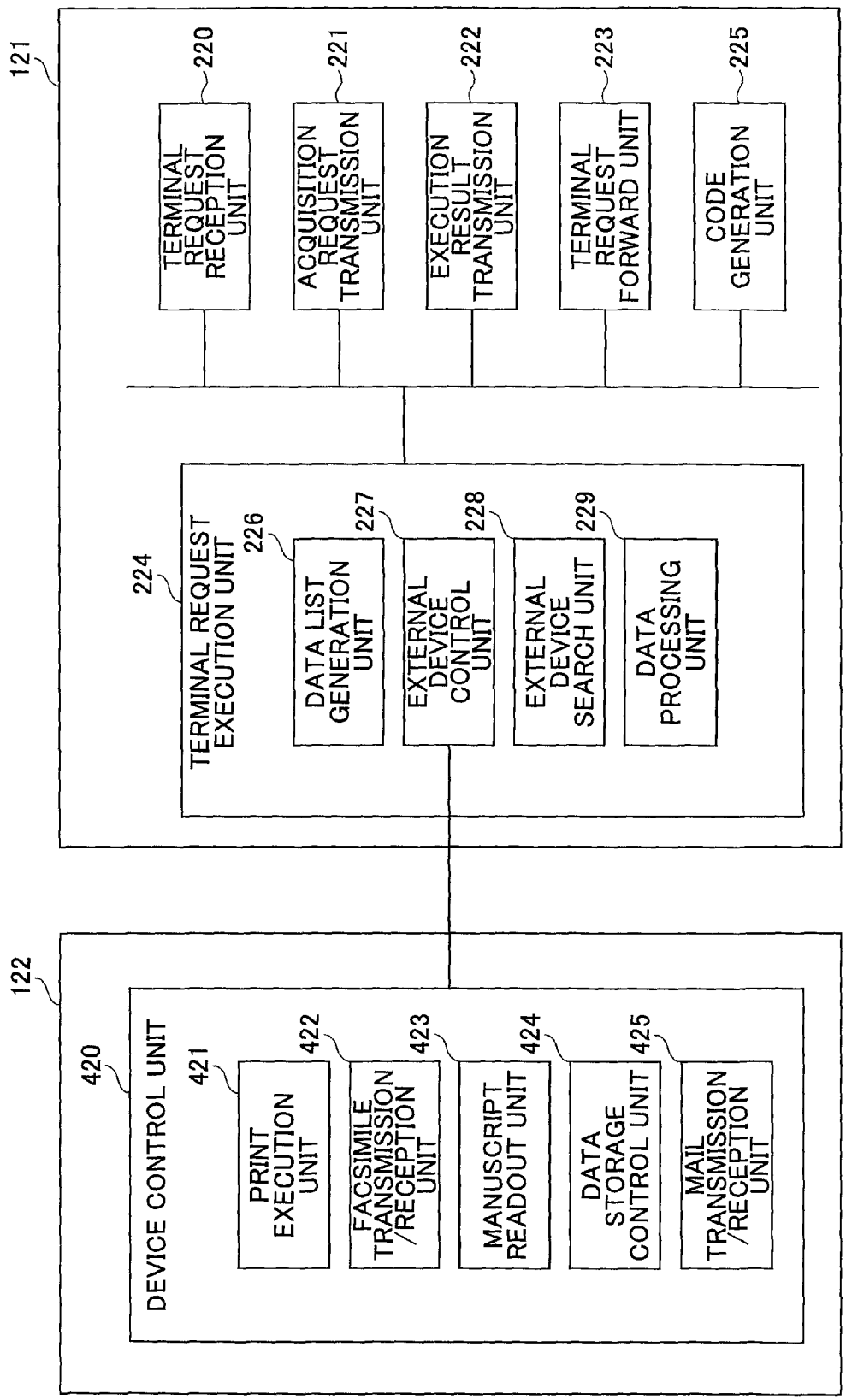
FIG. 7 is a function block diagram of the relay server shown in FIG. 2.

FIG. 7 is a functional block diagram of the file servers 121, 131 and the MFPs 122, 132. The file servers 121, 131 perform a process of storing various kinds of files, reading out a file according to the received terminal request, writing a file, forwarding a file, or the like. In the present embodiment, the file server is used, but the present embodiment is not limited to the file server. The device such as the PC or the MFP may be used. The file servers 121 and 131 have the same configuration, and only the file server A 121 will be explained.

The file server A 121 includes a terminal request reception unit 220, an acquisition request transmission unit 221, an execution result transmission unit 222, a terminal request forward unit 223, a terminal request execution unit 224 and a code generation unit 225, as functional units. These respective functions are realized by executing a program stored in the storage unit such as the ROM, the RAM, the HDD or the like at the CPU with which the file server is provided.

The acquisition request transmission unit 221 sends to the relay server 111 an acquisition request for a terminal request to the file server A 121. The acquisition request transmission unit 221 sends a contact ID of the file server A 121 which is included in the acquisition request. If a terminal request is put in a queue to which the contact ID is assigned, the relay server 111 sends the terminal request. If a terminal request is not put in the queue, the relay server 111 does not send anything.

The acquisition request transmission unit 221 sends an acquisition request periodically, and checks whether a terminal request is sent to the file server A 121. A time interval to send the acquisition request can be set to an arbitrary length. The acquisition request transmission unit 221 can send the acquisition request at a regular interval of the set length. The terminal request reception unit 220 acquires the terminal request by receiving the terminal request sent from the relay server 111 according to the acquisition request sent from the acquisition request transmission unit 221.

The terminal request execution unit 224 controls the file server A 121 in order to execute the terminal request received from the terminal request reception unit 220. In order to execute the process required by the file server A 121, the terminal request execution unit 224 can be provided with a data list generation unit 226, an external device control unit 227, an external device search unit 228, a data processing unit 229 or the like.

The terminal request execution unit 224, referring to the acquired terminal request, checks the process contents associated with the file server A 121. The terminal request, as described above, includes device information of file servers associated with the respective process contents, and the terminal request execution unit 224 can check the process contents based on the device information of the file server A 121. The process contents are scanning, outputting or saving electronic data, sending or receiving a facsimile, sending or receiving an electronic mail or the like. The outputting electronic data includes print outputting of electronic data and output for displaying to display device such as a projector. Moreover, the terminal request execution unit 224 instructs the data list generation unit 226 or the like to execute the predetermined process.

The data list generation unit 226 generates a list of electronic data stored in the file server A 121. The external device control unit 227 controls the operation of the external device connected to the file server A 121, for example, the MFP1 122, and requires the operation of the external device. The external device search unit 228 searches an external device connected to the file server A 121. The data processing unit 229 executes a process for electronic data including converting a file type of electronic data stored in the file server A 121 or of electronic data sent to the file server A 121, editing the electronic data, compressing the electronic data or the like.

The data processing unit 229, according to the checked process contents, as described above, executes the process to be executed by the data processing unit 229. For example, when the process content is saving electronic data, the data processing unit 229 performs the process of storing image data into the storage unit in the file server A 121.

The scanning, the outputting of electronic data or the like, other than saving, cannot be executed by the file server A 121 by itself, and the terminal request execution unit 224 makes the external device search unit 228 search a device which the file server connected to the same network can access. Moreover, the terminal request execution unit 224 makes the external device control unit 227 execute the control for the MFP1 122, which is a searched device. The external device control unit 227 instructs the MFP1 122 to execute the process of the checked process content, as described above.

The execution result transmission unit 222 sends the execution result executed at the terminal request execution unit 224 to the communication terminal 112 via the relay server 111. The execution result is a list of generated electronic data, a result of search for an external device, a result of processing data or the like. The terminal request forward unit 223 may forward a process of a received terminal request to the file server B 131, which executes after the file server A 121, with the execution result of executing the terminal request by the relay server 111.

The execution result transmission unit 222 referring to the terminal request, determines a file server associated with the next process content. The terminal request includes the plural process contents and the order of processing, and the process content next to the present process content can be easily determined. Moreover, the next process content is associated with device information, and a file server to which the terminal request is to be transmitted can be identified.

The execution result transmission unit 222 sends the terminal request including the execution result to the identified file server. In doing so, if the access is permitted, the terminal request can be directly sent. But, the file server is in a different network, and the access is inhibited in general. The execution result transmission unit 222 therefore sends the terminal request to the identified file server via the relay server 111. Meanwhile, if there isn't a next process content, the execution result transmission unit 222 sends only the execution result to the relay server 111. The relay server 111 sends the execution result to the communication terminal 112. That is, in the case of acquiring all execution results of the plural processes, the file server which acquires the final execution result sends the execution result for the terminal request to the communication terminal 112 via the relay server 111.

In the case where the execution result transmission unit 222 sends the terminal request via the relay server, the execution result transmission unit 222 sends a contact ID of the identified file server to the relay server 111. Accordingly, the relay server 111 can put the terminal request received from the file server A 121 into the queue to which the contact ID is assigned.

By employing the configuration as described above that sends a terminal request automatically and an execution result to the next device, plural devices such as file servers or MFPs connected to different networks can be operated by a single operation by a user.

The MFPs 122, 132 receive an instruction from the file servers 121, 131 and execute printing or the like. The MFPs 122 and 132 have the same configuration, and only the MFP1 122 will be explained. The MFP1 122 includes a device control unit 420 as its functional unit. The function is realized by executing a program stored in the storage unit such as the ROM, the RAM, the HDD or the like at the CPU with which the MFP1 122 is provided.

The device control unit 420 includes a print execution unit 421, a facsimile transmission/reception unit 422, a manuscript readout unit 423, data storage control unit 424 and a mail transmission/reception unit 425. These functional units receive an instruction from the file server A 121, perform a print, a transmission/reception of facsimile, a readout of manuscript, a data save and a transmission/reception of mail, and generates the execution result.

The file server A 121 sends the execution results executed by the file server A 121 or the execution result generated by the MFP1 122 to the relay server 111. The execution result generated by the MFP1 122 includes a message which indicates storing data normally or the like.

The file server A 121 may perform a process of converting a file created by an application for a document or an application for a presentation into an image file such as a JPG file or the like. For this reason, from a platform that cannot print a file created by the application for a document or the application for a presentation the communication terminal 12 can print the file.

The relay server 111 relays a terminal request from the communication terminal 112 to the file server A 121 or the file server B 131, and relays an execution result for the terminal request from the file server A 121 or the file server B 131 to the communication terminal 112. Accordingly, the relay server 111 functions as a relay device.

Figure 8:
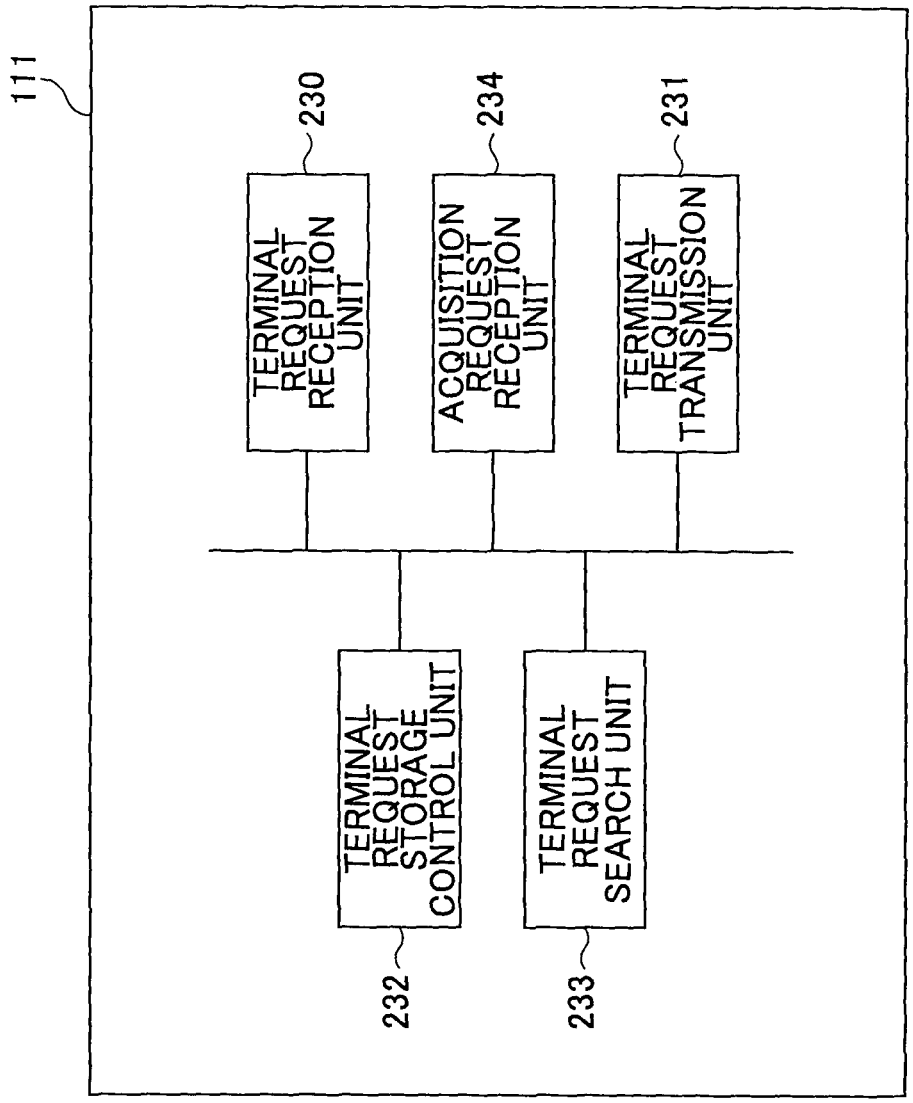
FIG. 8 is a function block diagram of the file server and the MFP shown in FIG. 2.

FIG. 8 is a functional block diagram of the relay server 111. The relay server 111 includes a terminal request reception unit 230, a terminal request transmission unit 231, a terminal request storage control unit 232, a terminal request search unit 233 and an acquisition request reception unit 234, as the functional units. These functions are realized by executing a program stored in the storage unit such as the ROM, the RAM, the HDD or the like at the CPU with which the relay server is provided.

The terminal request reception unit 230 receives a terminal request sent from the communication terminal 112 or the file server A 121, file server B 131. The terminal request storage control unit 232, stores the terminal request received by the terminal request reception unit 230 into the storage unit such as HDD or the like with which the relay server 111 is provided.

When the relay server 111 receives the terminal request from the communication terminal 112, the relay server 111 puts the terminal request into the queue for the file server of the destination. Respective queues are assumed to be, for example, FIFO (First-In First-Out) queues. To each of the queues, a contact ID of the file server A 121 or file server B 131 is assigned. For this reason, when the relay server 111 receives the terminal request in which the contact ID is specified, the relay server 111 can put the terminal request into the queue to which the contact ID is assigned.

The acquisition request reception unit 234 receives an acquisition request of the terminal request from the file server A 121. The terminal request search unit 233, searches a terminal request associated with the file server A 121 that sends the acquisition request in response to the acquisition request received by the acquisition request reception unit 234. When the terminal request search unit 233 searches the terminal request associated with the file server A 121, the terminal request transmission unit 231 sends the terminal request.

When the relay server 111 receives an acquisition request to acquire a terminal request from a file server having a contact ID, the relay server 111 can extract the terminal request from a queue for the file server to which the contact ID is assigned and send the terminal request to the file server.

The respective functional units for realizing the above processes can be realized, as described above, by executing the respective programs readout from the respective storage units by the respective CPUs. These programs are programs readable by a computer and can be provided stored in a recording medium such as an SD card memory or a CD-ROM. Moreover the programs can be stored in a content server or the like and can be provided by downloading.

The plural functional units implemented in the file server A 121, shown in FIG. 7, may be included in the file server A 121. Moreover, a part of the functional units may be included in the file server A 121 and the rest may be included in an other device. The other device may be any device such as a PC, an MFP or the like connected to the same local network.

Communication between the communication terminal 112 and the file server A 121 or the file server B 131 requires at first a process of registering two devices as a pair, which is called "pairing". The process of registering the pairing is by registering the file server A 121 or file server B 131 which can be accessed from the communication terminal 112.

At first, a code generation unit in one of the devices of pairing, for example the file server, generates a code including information of the device to be registered and access information in order to make the registration effective. The code includes a QR code (trademark registered), a color code or the like. Furthermore, the generated code is displayed on a display unit with which the file server A 121 is provided. In the present embodiment, the code is displayed on the display unit provided in the file server A 121, but the code may be displayed on a display unit of a PC, the MFP1 122 or the like connected to the file server A 121.

Figure 9:
FIG. 9 is a diagram illustrating an example of a screen displayed when a pairing with the file server is performed.

FIG. 9 is a diagram illustrating an example of a screen including a code displayed on the display unit. Contents of the code shown in FIG. 9 are assumed to include information shown in FIG. 10. For example, the contents include a server ID which is a file server identifier of the file server A 121 to be registered, an IP address of the file server, a contact ID and a link to be used for activation as the access information.

The server ID and the contact ID may be any characters, symbols, digits or combinations thereof. The IP address is assumed to be "192.168.0.2", as shown in FIG. 10. The link may be a URI (Uniform Resource Identifier), an IP address or the like, other than a URL (Uniform Resource Locator).

In the present embodiment, a configuration including a link is exemplified, but a configuration using a one-time password may be employed. The one-time password is a password that can be used for authentication only once, and may include arbitrary characters, symbols, digits or the like, e.g. "0123456789", or combinations of them. The one-time password is not limited to the above, but can be generated using a product serial number, a security code, a time or the like, which is registered in the file server A 121, for example.

Figure 11:
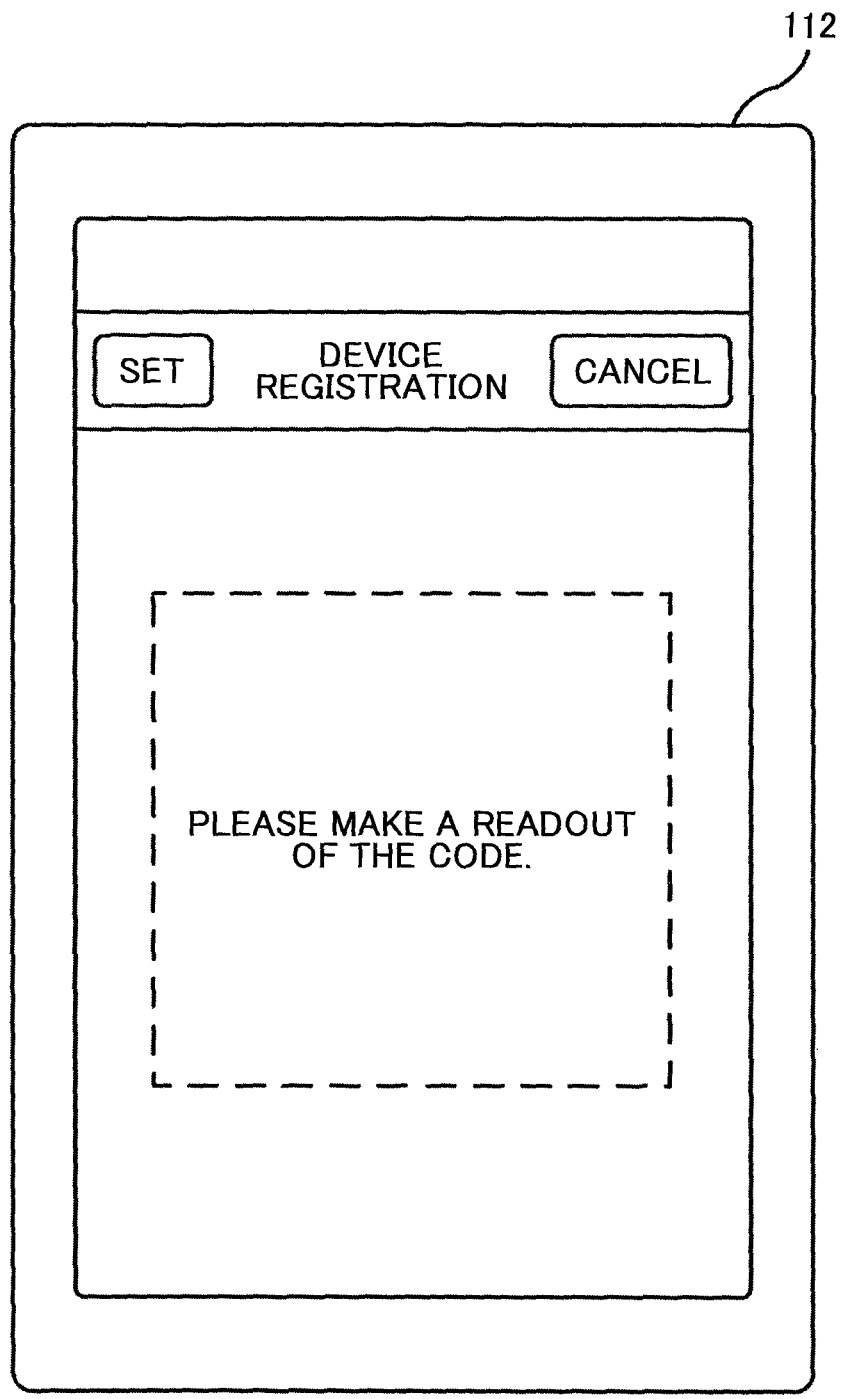
FIG. 11 is a diagram illustrating an example of a screen displayed on the communication terminal according to the present embodiment.

The input reception unit 323 of the communication terminal 112 receives an input for instructing to take a picture using a camera from the user. The image control unit 320 receives the input and takes a picture of the image. The user looks at the image on the code displayed on the display unit, and the communication terminal 112 takes a picture of the code. FIG. 11 is a diagram illustrating an example of a screen displayed on the communication terminal. The user manipulates the communication terminal 112 so that the code displayed on the display unit falls within a range with a caption "Please make a readout of the code", and takes an image of the code by depressing an imaging button.

Figure 12:
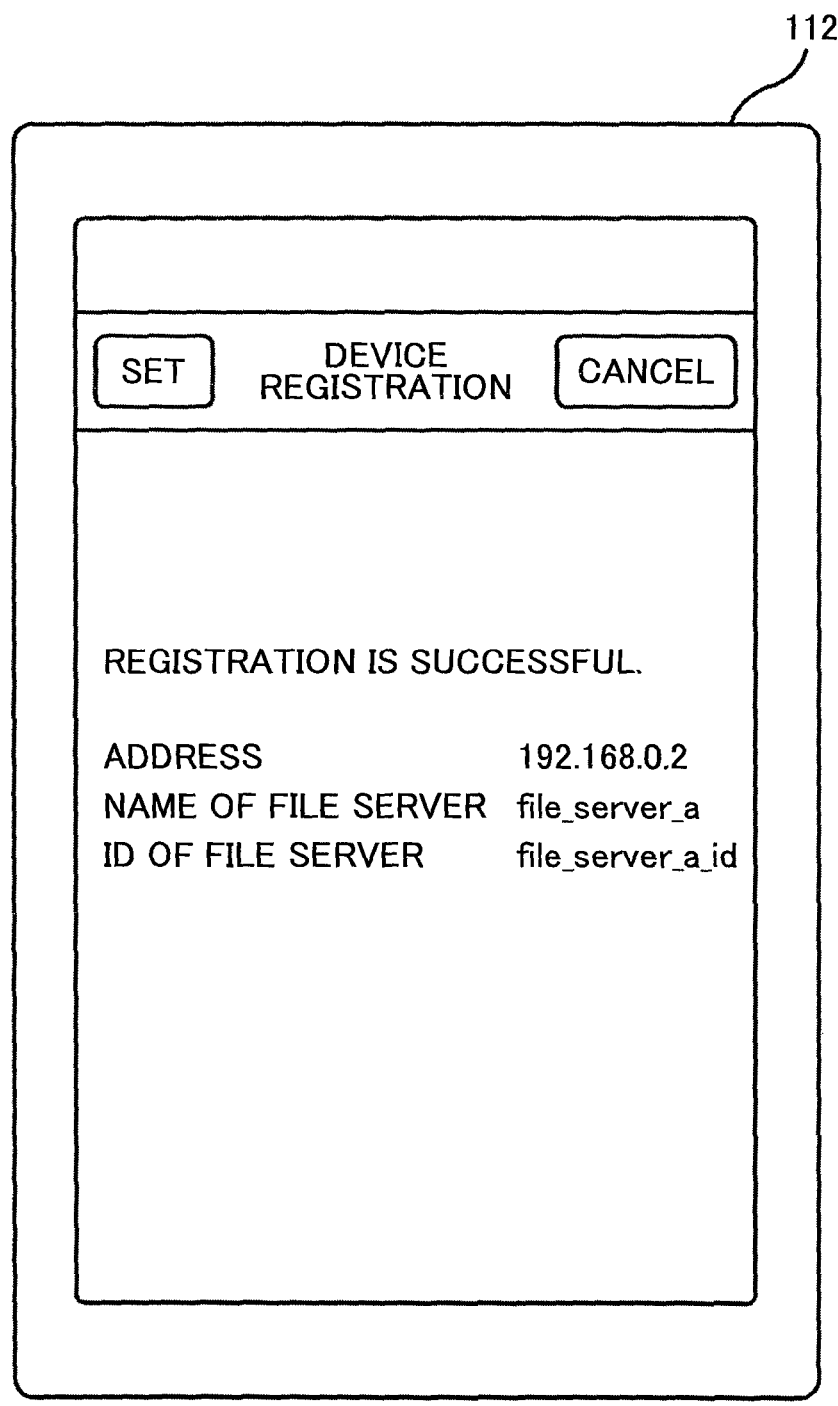
FIG. 12 is a diagram illustrating an example of a screen displayed on the communication terminal when the pairing is successful according to the present embodiment.

In the case where the code includes a link to be used for activation, when the link is accessed and the registration is made effective, the registration is successful. FIG. 12 is a diagram illustrating an example of the screen of the communication terminal 112 at this stage. As shown in FIG. 12, when the registration is successful, a message that the registration is successful, an IP address of the file server A 121, a name of the file server and a file server ID (contact ID) are displayed. In this way, by registering the information of the file server A 121 in the communication terminal 112, the file server A 121 can be used.

Figure 13:
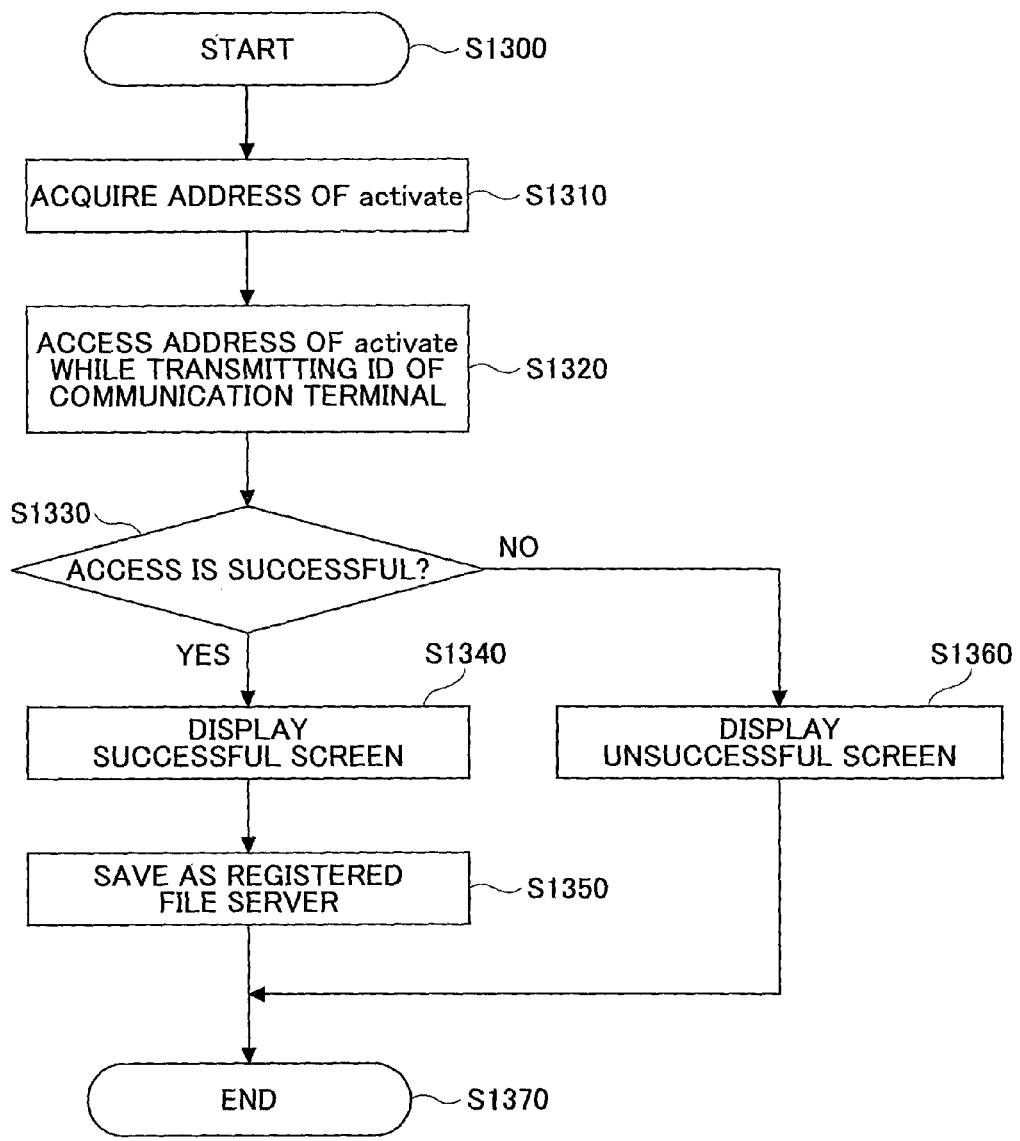
FIG. 13 is a flowchart illustrating an example of a process executed when the pairing is performed according to the present embodiment.

With reference to FIG. 13, a flow of the procedure of reading the code in the communication terminal 112, until the registration is completed, will be explained in detail. The process starts by imaging the code displayed on the display unit by the communication terminal 112 (step S1300). At first, the an address of the link used for the activation is acquired from the imaged code (step S1310). The URL "http://192.168.0.2/activate/user1/abcdefghijklmnopqrstuvwxyz", shown in FIG. 10, is acquired.

Next, the link is accessed while sending the ID of the communication terminal 112, which is terminal identification information for identifying the communication terminal 112, to the file server A 121 (step S1320). The process at step S1320 is for registering information on the file server A 121 to the communication terminal 112, while registering the information on the communication terminal 112 to the file server A 121.

It is determined whether the link is accessed (step S1330). If it is determined the link is accessed, the process proceeds to step S1340, and a screen indicating that the access is successful is displayed (step S1340). FIG. 12 is a diagram illustrating an example of the screen at step S1340. Next, the contents are stored in the communication terminal 112 as the registered file server A 121 (step S1350). The process ends at step S1370.

If it is determined the link isn't accessed at step S1330, the process proceeds to step S1360, and a screen indicates that the access is not successful by displaying error messages or the like (step S1360). The process ends at step S1370.

In order to realize the above process, the information processing system 100 may further include a display part for displaying the code to be read out by the communication terminal 112 in addition to the functional units, shown in FIGS. 6 to 8. Moreover, the information processing system 100 may be provided with a terminal registration unit that registers the ID of the communication terminal 112 transmitted from the communication terminal 112. For this reason, the information processing system 100 may be provided with a registration determination unit that determines whether an ID transmitted with a terminal request has been registered or not, so as not to receive a terminal request from an unregistered communication terminal. The file server A 121 or file server B 131 may be provided with the above functional units, for example, but the present embodiment is not limited to this.

Figure 14:
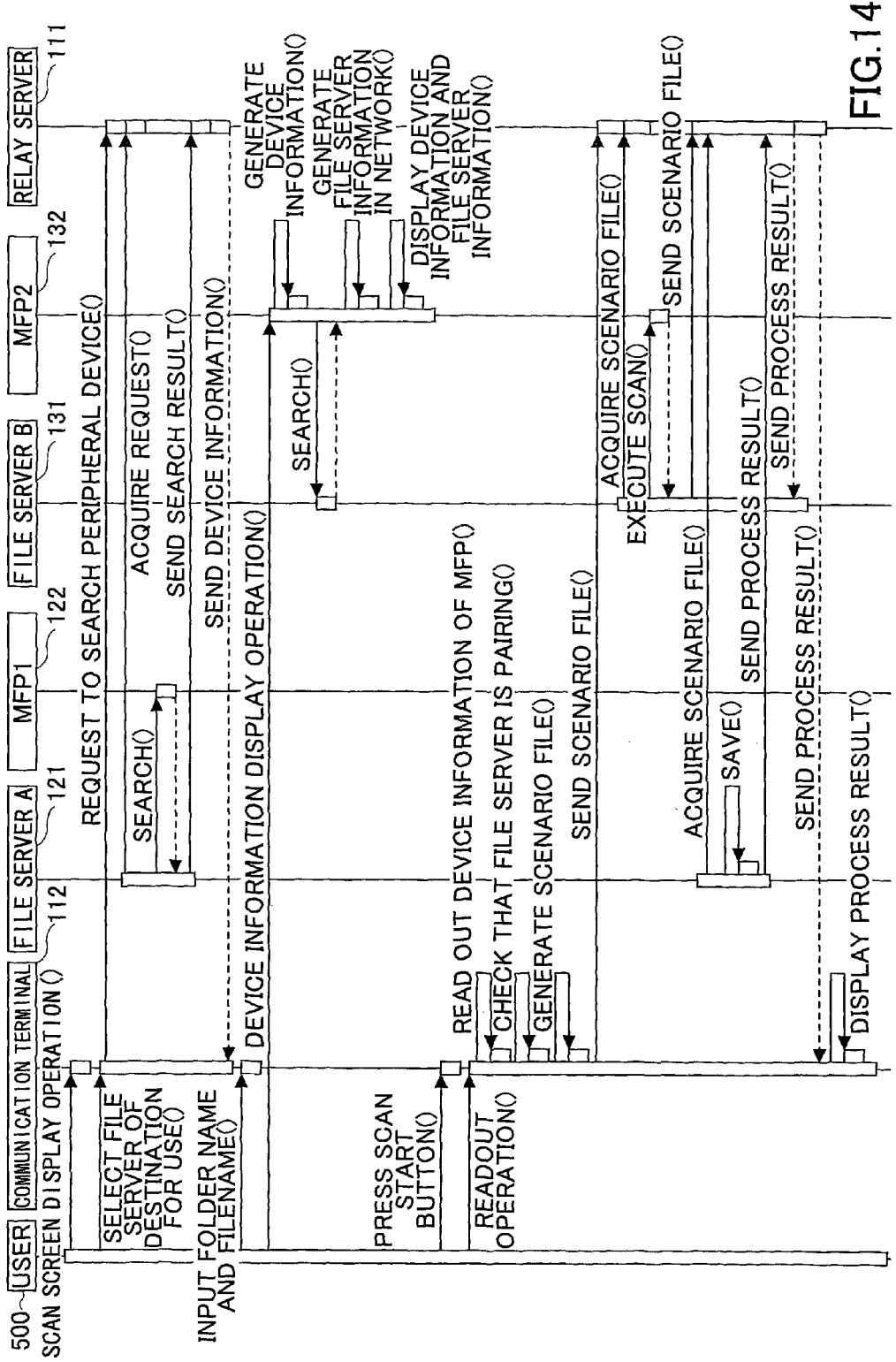
FIG. 14 is a sequence diagram illustrating an example of a process of executing a reading out of an image and storing the image in the file server "A" according to the present embodiment.

Next, the process of scanning, as a first process, and storing in a file server "A", as a second process using the information processing system 100 having the configuration, as shown in FIG. 2, will be explained with reference to a sequence chart shown in FIG. 14. The file servers "A" and "B" correspond to the file servers 121 and 131, respectively. Moreover, an MFP1 and an MFP2 correspond to the MFP1 122 and the MFP2 132, respectively. FIG. 14 shows a user 500, which is not a device. At first, the user 500 makes the communication terminal 112 display a scan control screen, and controls the displayed screen.

Figure 15:
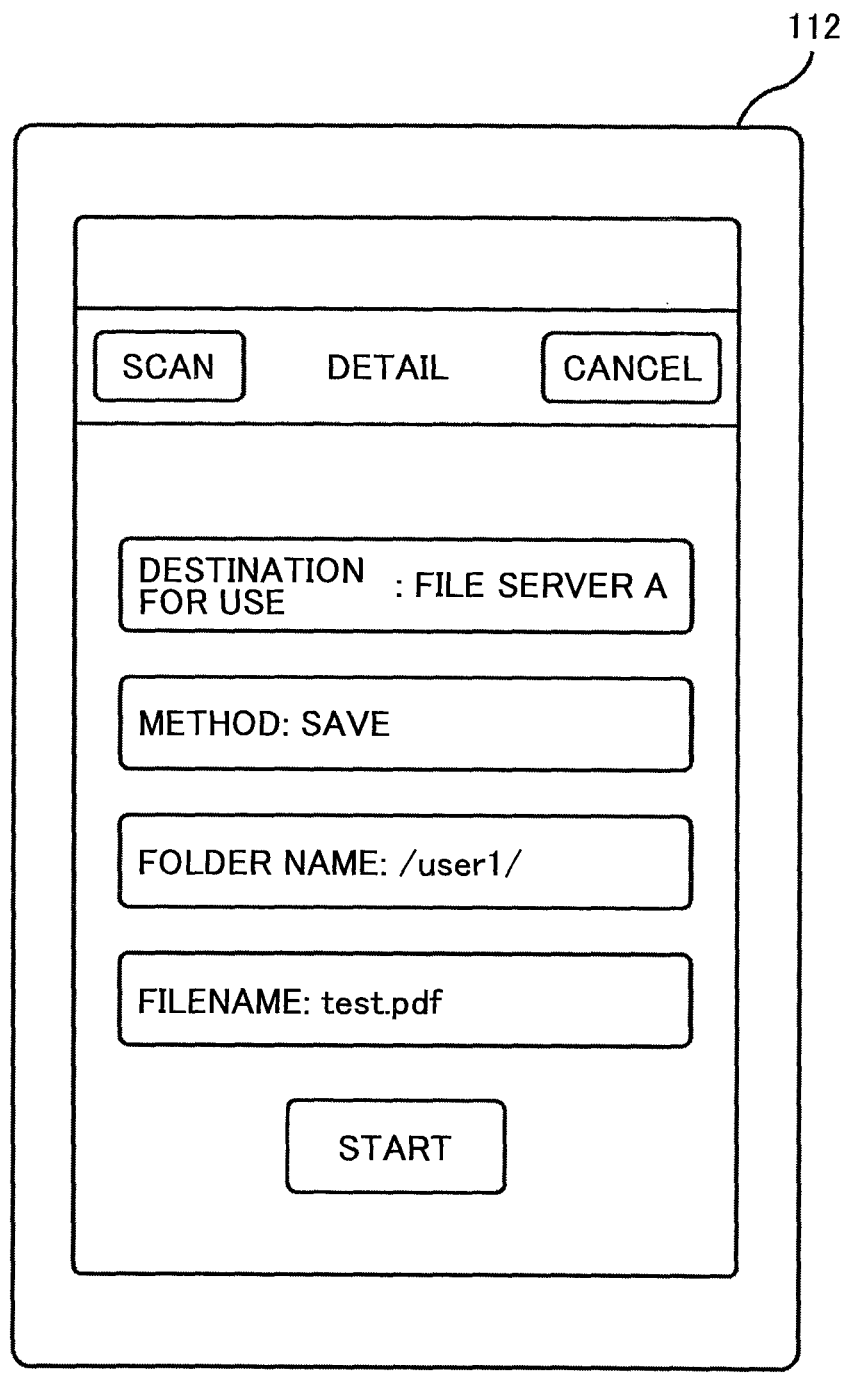
FIG. 15 is a diagram illustrating an example of a screen for performing a setting when the reading out of the image is executed according to the present embodiment.

FIG. 15 is a diagram illustrating an example of the scan control screen. At first, the user 500 selects the files server A 121 as the destination for the user in the displayed screen. With reference to FIG. 14, after the above selection, the communication terminal 112 requests the relay server 111 to search for peripheral devices. That is, the communication terminal 112 sends a search request to search for a device which the file server A 121 can access and control to the relay server ill.

The relay server 111 puts the search request into the queue for the file server A 121, and waits for an acquisition request from the file server A 121. When the acquisition request comes from the file server A 121, the relay server 111 sends the search request to the file server A 121.

When the file server A 121 receives the search request, the file server A 121 searches a device connected to the same network, and identifies a device which can be accessed. Furthermore, the file server A 121 sends device information on the device which can be accessed to the relay server as a result of the search. When the relay server 111 receives the device information, the relay server 111 sends the device information to the communication terminal 112.

The selection of the file server A 121 as the destination for use by the user 500 is followed by an input of a method of use by the user 500 from a screen shown in FIG. 15. The method of use may be selected from options. The options may include, for example, saving, outputting, sending a mail, sending a facsimile, or the like.

When the saving option is selected as the method of the user, a folder name and a filename are input. The folder name is a folder name of the destination to save as a storage location. The filename is a filename assigned when the file to be saved is saved.

Next, the user 500 makes the control panel display the device information from the MFP2 132 in the neighborhood of the user 500, as shown in FIG. 14. The MFP2 132 receives the control by the user 500, collects information on the IP addresses of the like which the MFP2 132 possesses, and generates device information. The MFP2 132 searches for a device connected to the same network. Then, the MFP2 132 acquires device information of the file server B 131 which is the discovered device, and generates file server information. The MFP2 132 makes the control panel display the generated device information and the file server information.

Figure 16:
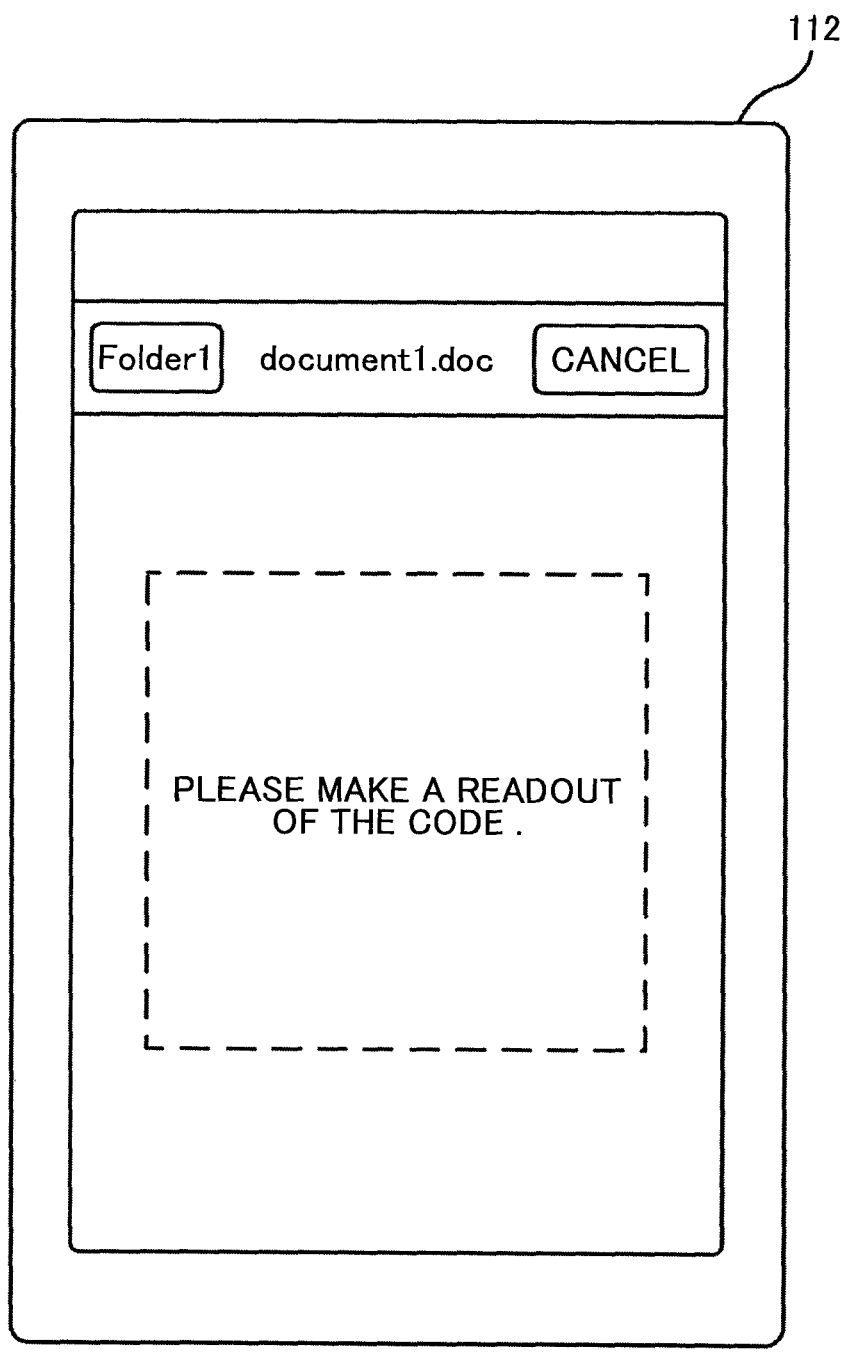
FIG. 16 is a diagram illustrating an example of a screen displayed when the reading out of the image begins according to the present embodiment.

The information displayed on the control panel may include an address or the like displayed using characters or numerals, but may be displayed by a code as exemplified in FIG. 16.

When the user 500 presses the start button in the screen as shown in FIG. 15, the communication terminal 112 displays a screen as shown in FIG. 16 in response to the press of the start button. The screen shown in FIG. 16 is similar to the screen shown in FIG. 11, and is a screen for reading out a code displayed on the control panel of the MFP2 132. The user 500 controls the communication terminal 112 so that the code displayed on the display unit falls within a range with a caption "Please make a readout of the code", and takes an image of the code by depressing an imaging button. For the code, a QR code (trademark registered), which is shown in FIG. 17, a color code or the like may be employed.

Figure 17:
FIG. 17 is a diagram illustrating an example of a code displayed on a control panel of the MFP according to the present embodiment.

The content of the code shown in FIG. 17 is the content shown in FIG. 18. Specifically, the content includes a file server name of the file server B 131, an IP address, a file server identifier, a kind of device (a file server), and information that an accessible device is the MFP2 132. Moreover, the content includes a device name of the MFP2 132, an IP address, device identification information, a kind of device (MFP), and information that an accessible device is the file server B 131. This is an example, and may further include other information.

In the present embodiment, as described above, the MFP2 132 automatically searches the file server B 131 connected to the same network, and generates the file server information from the acquired device information. But the present invention is not limited to this. The file server information may be registered manually.

In the case of manually registering the file server information, a screen as shown in FIG. 19 is displayed, and a name of a device and an IP address are input. A keyboard image may be displayed, on which the input is performed by touching to select. After the input, by pressing the registration button, a registration is performed. Moreover, by pressing the cancel button, the input information can be cancelled.

With reference to FIG. 14, the user 500 reads out the code by using the communication terminal 112. That is, the communication terminal 112 reads out the device information and the file server information of the MFP2 132. Then, the communication terminal 112 confirms that the file server B 131 acquired by the file server information is a device of pairing with the communication terminal 112. That is, the communication terminal 112 determines whether the file server B 131 is registered or not, and confirms based on the result of the determination.

The communication terminal 112, notified of the confirmation, generates a terminal request. In the present embodiment, as the terminal request, a file called "scenario file" is generated. The scenario file includes a process request indicating process contents to be executed at the respective file servers, an order of processes and device information.

The communication terminal 112 send the scenario file to the relay server 111 in order to send the scenario file to the file server B 131 which performs the first process. The relay server 111 puts the scenario file into a queue for the file server B 131, and waits for an acquisition request from the file server B 131.

The relay server 111, in response to the acquisition request from the file server B 131, sends the scenario file put in the queue for the file server B 131 to the file server B 131. The file server B 131 refers to the scenario file, and knows that the process content is scanning. The file server B 131 makes the MFP2 132, which can be accessed, execute the scanning. When the scanning is successful, the MFP2 132 returns to the file server B 131, as a process, an execution result of the process that the scanning is successful and image data of the read-out image.

The file server B 131 records in the scenario file that the process content has been executed and is successful, and appends the image data to the scenario file. Furthermore, the file server B 131 refers to the scenario file and specifies the file server A 121 which is associated with the next process content. The file server B 131 uses the IP address of the file server A 121 in the scenario file, and tries to access it. But the access is not successful since the file server A 121 is connected to a different network. For this reason, the file server B 131 sends the scenario file to the relay server 111.

The relay server 111 receives a file server identifier of the next file server A 121 as well as the scenario file. For this reason, the relay server 111 puts the scenario file into a queue for the file server A 121 and waits for an acquisition request from the file server A 121.

When the acquisition request comes from the file server A 121, the relay server 111 extracts the scenario file from the queue for the file server A 121, and sends the scenario file to the file server A 121. The file server A 121 refers to the received scenario file, extracts the process content of saving the image data, and executes the process according to the process content. That is, the file server A 121 extracts the image data appended to the scenario file and saves the image data in the storage unit provided in the file server A 121. Meanwhile, a folder of the destination to save and a filename of the file saved are assumed to be a folder of the folder name and the filename specified in the screen as shown in FIG. 15.

When the saving of the image data ends, the file server A 121 acquires an execution result. The file server A 121 refers to the scenario file to specify a file server which performs the next process, but the next process does not exist. The file server A 121 sends the execution result to the relay server 111 in order to send the execution result to the file server B 131 and the communication terminal 112. The relay server 111 notifies the file server B 131 of the execution result and sends an execution result for the scenario file to the communication terminal 112.

The communication terminal 112 receives the execution result, displays the execution result on the screen and presents the result to the user 500. The user 500 sees the result on the screen and knows whether the process has been successful or not.

The file server A 121 or file server B 131 may include a functional unit, such as a communication determination unit, a code acquisition unit, or a device registration unit, in addition to the terminal request reception unit 220 or the like, as described above.

The communication determination unit performs access by using device information of device included in the terminal request, and determines whether the device is an accessible device. The device includes the file server, the MFP or the like, the device information includes a device name, device identification information, an IP address and information on other accessible device. The execution result transmission unit 222, in response to the determination, can switch between sending directly to the other device and sending via the relay server 111. The file server A 121 or file server B 131, for example, includes the communication determination unit, and can switch the sending of the scenario file as described above.

The code acquisition unit acquires device information possessed by the file server as a code (a first code). The code is a code as shown in FIG. 9. From this, the communication terminal 112 can be provided with the code acquisition unit.

The device registration unit extracts device, information from the code acquired by the code acquisition unit, and registers the extracted device information as device information of the file server which the communication terminal 112 can access. This registration is performed by saving in the communication terminal 112.

The code generation unit 225 uses the device information, which the external device search unit 228 searches and acquires, and generates a code (a second code) as shown in FIG. 12. The code generation unit 225 can generate the code by using any software ever known. The code generation unit 225 may be implemented in a device such as the MFP1 122 or MFP2 132.

Next, the process of generating the scenario file in the communication terminal 112 will be explained with reference to FIG. 20. The process starts at step S2000. Next, for example, device information of a device extracted from the read-out code and of a file server which can access the device is appended to a previously provided template for a scenario file (step S2010).

A message for making the MFP execute scanning from a file server which can access the MFP is appended to the scenario file (step S2020). The message indicates process contents, such as scanning or the like. A message for saving a result of the scanning in the file server which is selected by a user's control is appended to the scenario file (step S2030).

A folder name of the destination to save and a filename assigned when the file is saved are appended to the scenario file (step S2040). Accordingly, the scenario file is generated, and the process ends (step S2050). The processes at steps S2020 to S2040 are executed in response to the user's selection of the method of use.

FIG. 21 is a diagram illustrating an example of the generated scenario file. In this example, the scenario file is described in the JSON (Java Script Object Notation) format. The JSON is one of the data description languages and is based on the notation in the Java Script (trademark registered). This description includes a scenario part describing what respective file servers perform, a device part describing information on related devices and a resources part saving meta information such as a result of a scan. Meanwhile, meta information includes an execution result of a process.

The scenario part describes that in the first process, an order of processes of which is the first, the file server "B" makes the MFP2 execute scanning. Moreover, the scenario part describes in the next second process the file server "A" saves with a filename "test.pdf" in a folder "/user01/". The device part describes as related devices the file servers "A" and "B", the MFP1 and the MFP2, and describes a device name, a device identification information, an IP address of each of the devices and information on an accessible device.

FIG. 22 is a flowchart illustrating a flow of a process executed when the scenario file shown in FIG. 21 is sent to the file server "B". The process starts at step S2200. The file server "B" instructs a device described in the scenario file, and the device executes the scanning (step S2210). In the scenario file shown in FIG. 21 the MFP2 is described, and the MFP2 executes the scanning. Furthermore, the file server "B" acquires a result of the scanning and image data of the read-out image from the MFP2.

The file server "B" appends the scanned data, i.e. the image data, to the scenario file (step S2220). Furthermore, the file server "B" records a result of the scanning in the scenario file (step S2230). For example, if the scanning is successful, a description such as "success" is recorded.

The file server "B" sends the scenario file to the file server "A" via the relay server (step S2240). The process ends at step S2250.

FIG. 23 is a diagram illustrating an example of the scenario file after the result of the scanning is recorded at step S2230 in FIG. 22. In FIG. 23, image data are appended to the "resource1" in the resource part as binary data. Moreover, "status" in the first process changes from "unexecuted", indicating that the scanning has not been executed, to "executed", indicating that the scanning has been executed. Furthermore, in "record", the description ""result":"success"", indicating that the process is successful, is recorded.

Figure 24:
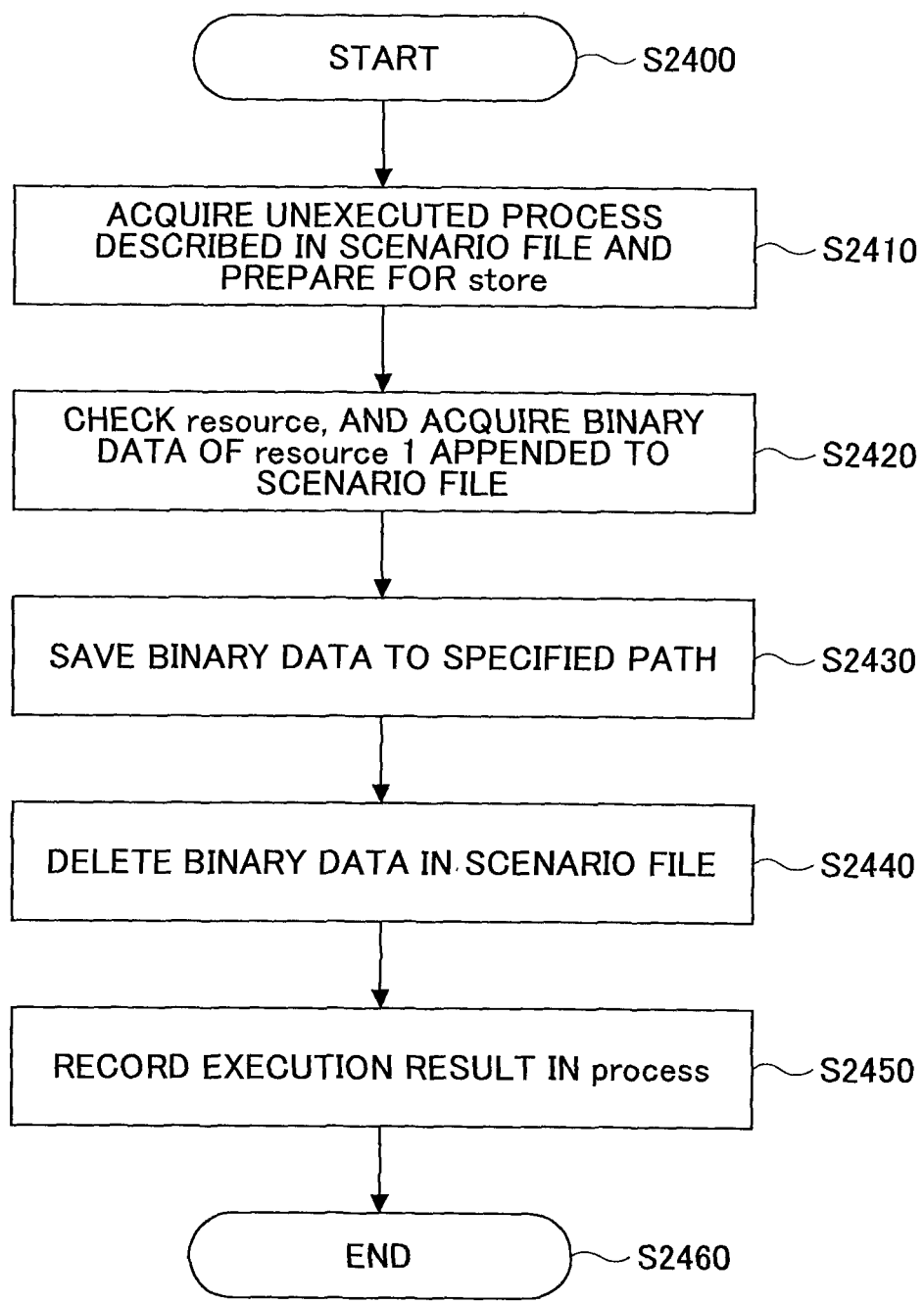
FIG. 24 is a flowchart illustrating an example of a process after the file server "A" acquires the scenario file according to the present embodiment.

FIG. 24 is a flowchart illustrating a flow of a process executed when the file server "A" receives the scenario file shown in FIG. 23. The process starts at step S2400. The file server "A" acquires an unexecuted process described in the scenario file, checks the process contents and prepares for "store" (step S2410).

Since the file server arranges a file service, as described above, the file server makes a preparation for generating a command instructing the file service to perform the "store" or the like.

The file server "A" checks the "resources" part in the scenario file and acquires binary data of the appended "resource1" (step S2420). Then, the file server "A" saves the binary data to a specified path which is described in the scenario file (step S2430). The specified path includes a specified folder and a specified filename, and the binary data is saved in the folder and is assigned the filename.

The file server "A" deletes the binary data in the scenario file (step S2440), since the binary data is not used after that. A result of the execution is recorded in the process part (step S2450), and the process ends at step S2460.

FIG. 25 is a diagram illustrating an example of the scenario file after the result of the execution is recorded in FIG. 24. In FIG. 25, the "status" of the second process changes from "unexecuted", indicating that the saving has not been executed, to "executed", indicating that the saving has been executed. Moreover, in the "record", the description ""result":"success"" indicating that the process is successfully recorded. Furthermore, the binary data in the "resources" part are deleted.

Figure 26:
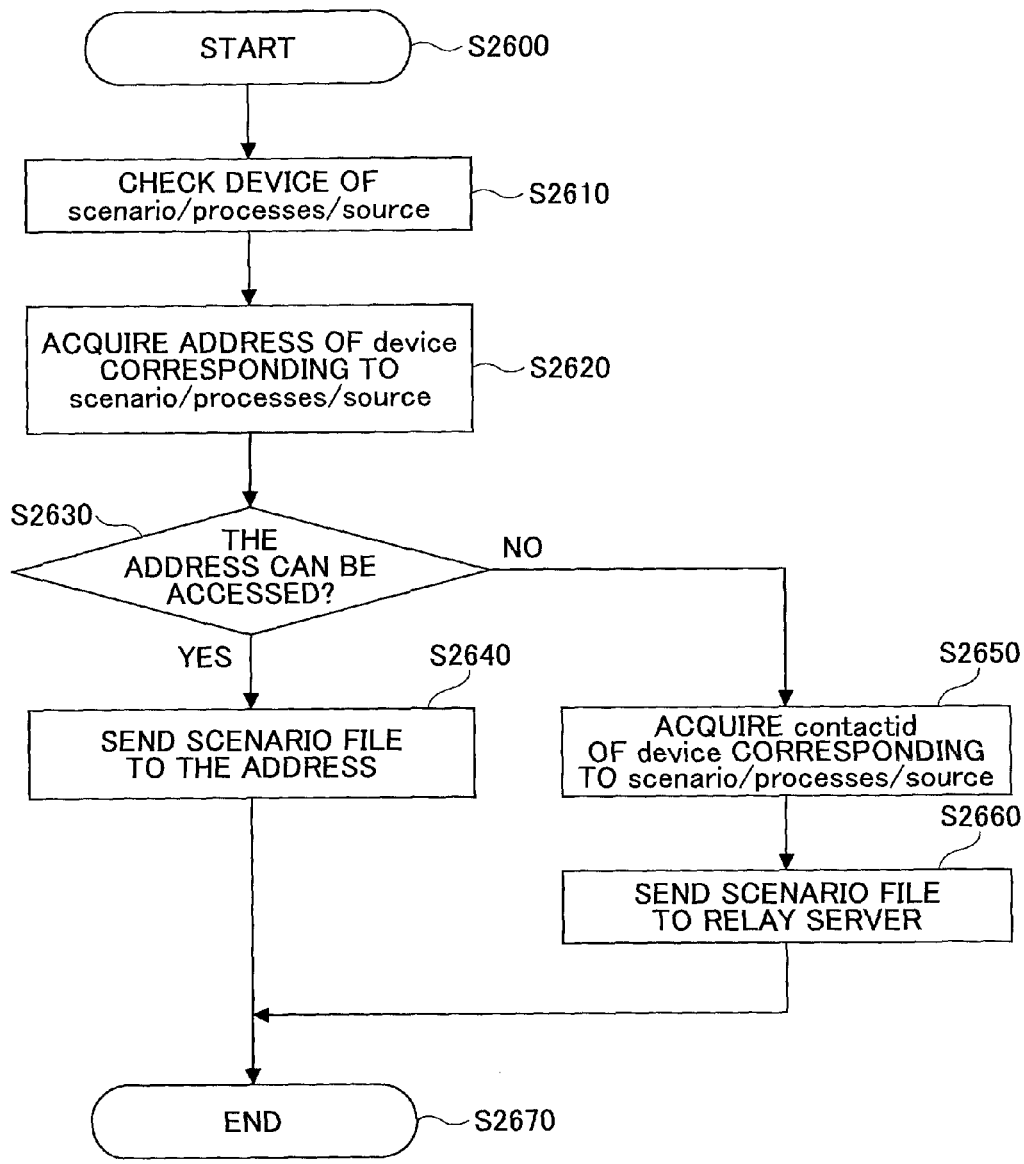
FIG. 26 is a flowchart illustrating an example of a process transmitting the scenario file to a next device according to the present embodiment.

FIG. 26 is a flowchart illustrating a flow of a process when the scenario file is sent from the file server "B" to the file server "A". The process starts at step S2600. The file server "B" checks a device described in the "source" of the "processes" of the scenario part in the scenario file (step S2610). In the scenario file shown in FIG. 23, it is checked that a device described in the "source" of the next second process is the file server "A".

The file server "B" acquires an address of the device which corresponds to the file server "A" from the device part in the scenario file (step S2620). The file server "B", using the address, checks, whether the file server "B" can access the file server "A" (step S2630).

When the file server "B" can access the file server "A" at step S2630, the process proceeds to step S2640, and the scenario file is directly sent to the address. The process ends at step S2670.

When the file server "B" cannot access the file server "A" at step S2630, the process proceeds to step S2650, and the contact ID of the file server "A" is acquired from the device part in the scenario file. The file server "B" sends the scenario file with the contact ID to the relay server (step S2660). The process ends at step S2670.

In the present embodiment, an example where a content of the scenario file is scanned at file server "B" and image data saved in file server "A" has been described. Another example will be explained in the following. In this example, scanning is the same, but the image data are output to the MFP1. The flow will be explained with reference to a sequence diagram shown in FIG. 27.

Figure 27:
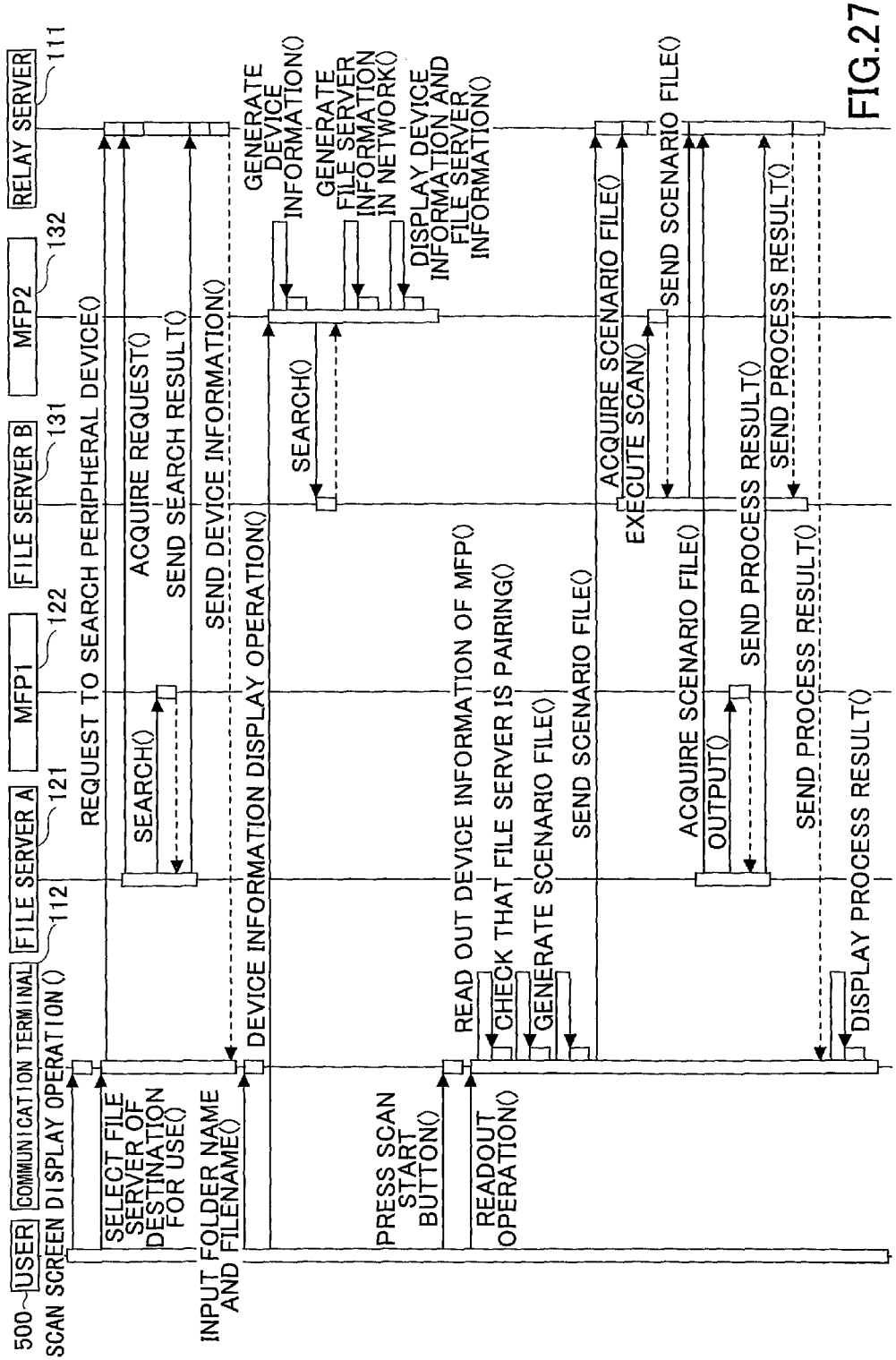
FIG. 27 is a sequence diagram illustrating an example of a process of reading out an image at the MFP2 and outputting the image to the MFP1 according to the present embodiment.

Though it is almost the same as the sequence flow shown in FIG. 14, FIG. 27 is different only in a part where the file server A 121 outputs the image data to the MFP1 122. The file server A 121 sends an acquisition request to the relay server 111. When the scenario file is put into a queue for the file server A 121, the file server A 121 acquires the scenario file.

The file server A 121 checks the acquired scenario file, acquires the image data appended to the scenario file, and outputs the image data to the MFP1 122. The MFP1 122 notifies the file server A 121 that the MFP1 122 received the image data. Meanwhile, since other processes have been already explained, the explanation will be omitted.

Figure 28:
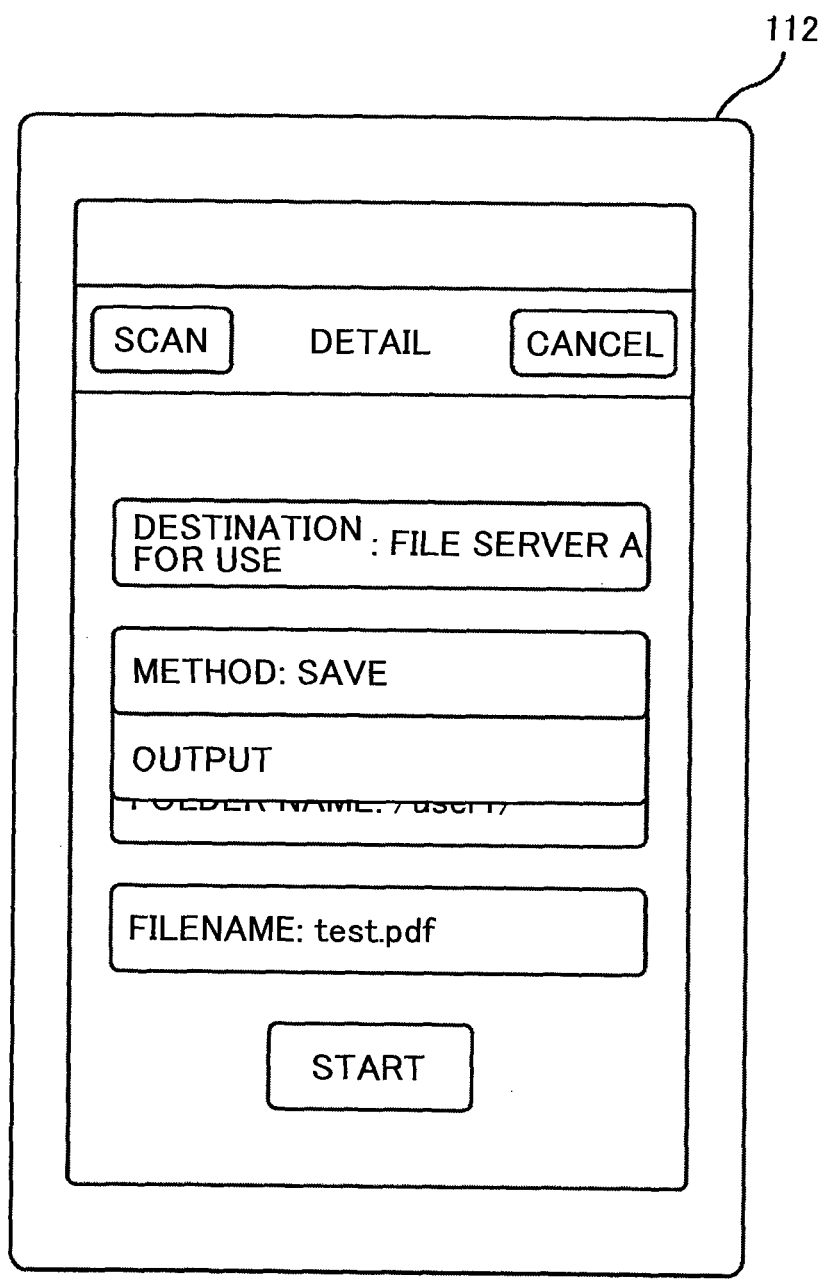
FIG. 28 is a diagram illustrating an example of a screen for choosing between saving a file and outputting the file according to the present embodiment.

FIG. 28 is a diagram illustrating an example of a screen of the communication terminal 112, on which the user selects saving a file or outputting the file. In FIG. 28, the methods of use are displayed in a list and selectable. The user, for example, touches "output" to select it, and the method of use can be switched from "saving" to "outputting" shown in FIG. 28.

Figure 29:
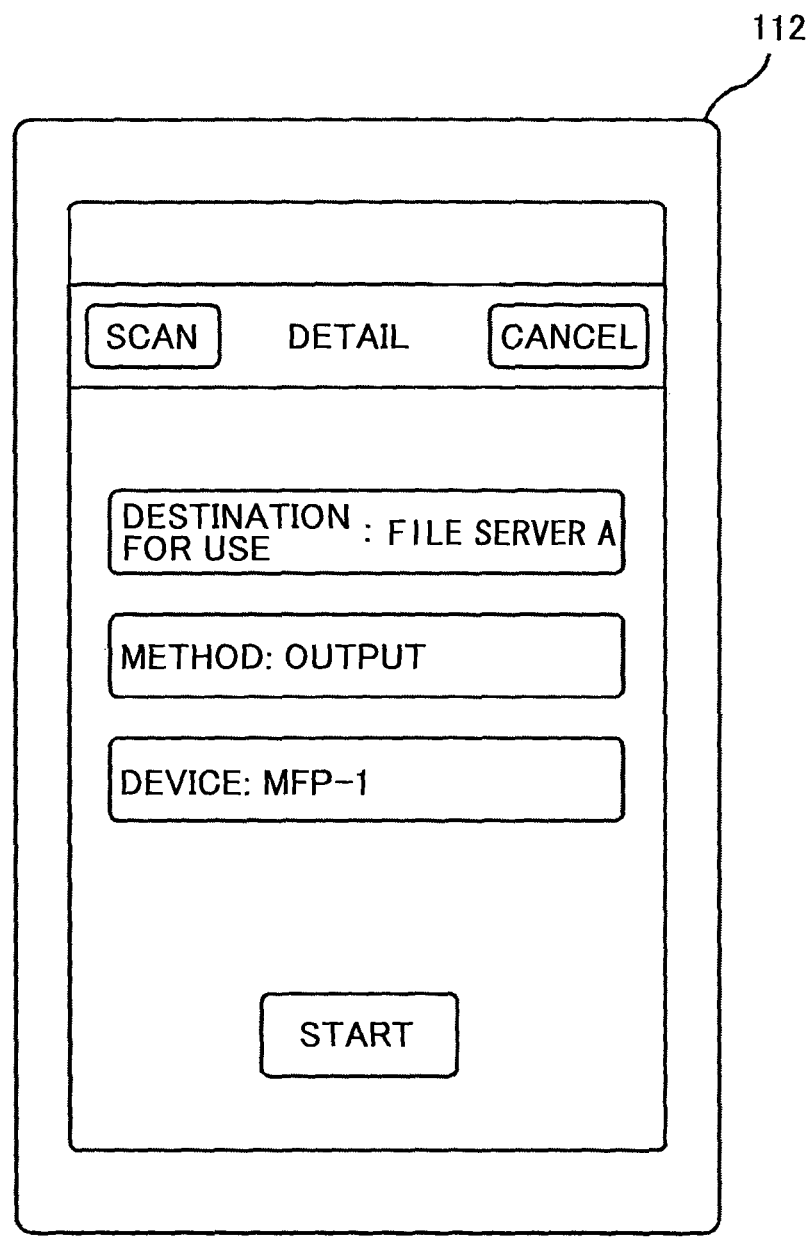
FIG. 29 is a diagram illustrating an example of a screen when the outputting the file is selected in the screen shown in FIG. 28.

FIG. 29 is a diagram illustrating an example of a screen displayed when "outputting" is selected in the screen shown in FIG. 28. When "saving" is selected, the screen shown in FIG. 15 is displayed. In this example, there aren't input items such as a "folder name" or a "filename", but the input item is assumed to be a "device". This device indicates a device name of a destination to output, to which data are output. This device name may also be displayed in a list and selected among devices found by the search for devices connected to the same network as the file server "A".

FIG. 30 is a diagram illustrating an example of the scenario file generated after the output device is selected and the start button is depressed in the screen shown in FIG. 29. Compared with the scenario file shown in FIG. 21, FIG. 30 is different in a part where the "destination" of the second process is "mfp1", and the "name" of the "message" is "output".

FIG. 31 is a diagram illustrating an example of the scenario file after the scanning is executed at the MFP2 in the first process. As in FIG. 23, the image data are appended to a "resource1" in the resources part as binary data. Moreover, the "status" of the first process is changed from "unexecuted", indicating that the scanning has not been executed, to "executed", indicating that the scanning has been executed. Furthermore, in the "record", the description ""result":"success"", indicating that the process is successful is recorded.

FIG. 32 is a diagram illustrating an example of the scenario file after the printing is executed at the MFP1 in the second process. As in FIG. 25, the "status" of the second process is changed from "unexecuted", indicating that the printing has not been executed, to "executed", indicating that the printing has been executed. Moreover, in the "record", the description ""result":"success"", indicating that the process is successful is recorded. Moreover, the binary data in the resources part are deleted.

According to the present invention, a communication method including the processes executed by the respective functional units, the information processing system is provided with, as process steps can also be provided. By providing the information processing system, the information processing method and a program, plural devices can be operated only by a single control of the user to send a scenario data. Since the control is only once, the control is simple and a burden on the user is reduced.

Moreover, in the present invention, since switching between sending directly to the next device and sending via the relay server is possible, what can be directly sent can be sent to the next device promptly. Accordingly, required time for the process can be shortened.

Moreover, since a terminal request from a communication terminal which has not been registered can be set to be rejected, security can be guaranteed. Furthermore, by reading out a code such as a two-dimensional code, information can be acquired easily. Moreover, a third party is prevented from seeing the information on the file server or the like, and security is guaranteed.

In the information processing system according to the present invention, since a device connected to the same network can be automatically searched, and can be input manually, the system is an easy-to-use system also for the user. Moreover, since a configuration in which a code is read out and registered is employed, information on plural file servers is unnecessary to be known in advance, and a communication between the plural file servers becomes possible.

The present invention is described as the information processing system, the information processing method and the program, with the above embodiments. The present invention is not limited to the specifically disclosed embodiments, but various variations and modifications may be made without departing from the scope of the present invention.

The present application is based on and claims the benefit of priorities of Japanese Priority Applications No. 2013-052800 filed on Mar. 15, 2013 and Japanese Priority. Application No. 2014-038695 filed on Feb. 28, 2014 with the Japanese Patent Office, the entire contents of which are hereby incorporated by reference.

DESCRIPTION OF THE REFERENCE NUMERALS 10,110 global network
11,15,120,130 local network
12,16,21,140,141,142 firewall
13,17 file server
14,18 MFP
19 mobile terminal
20 base station
22,111 relay server
100 information processing system
112,300 communication terminal
121 file server A
122 MFP1
131 file server B
132 MFP2
200 computer
201,409 input device
202,410 display device
203 external I/F
204,303,415 RAM
205,302,414 ROM
206,301,416 CPU
207 communication I/F
208,405 HDD
209,408 bus
210,307,412 recording medium
220 terminal request reception unit
221 acquisition request transmission unit
222 execution result transmission unit
223 terminal request forward unit
224 terminal request execution unit
225 code generation unit
226 data list generation unit
227 external device control unit
228 external device search unit
229 data processing unit
230 terminal request reception unit
231 terminal request transmission unit
232 terminal request storage control unit
233 terminal request search unit
234 acquisition request reception unit
304 EEPROM
305 CMOS sensor
306 acceleration and orientation sensor
308 media drive
309 sound input unit
310 sound output unit
311 antenna
312 communication unit
313 wireless LAN communication unit
314 near field communication antenna
315 near field communication unit
316 display unit
317 touch panel
318 bus line
319 battery
320 image control unit
321 terminal request transmission unit
322 execution result reception unit
323 input reception unit
324 display control unit
325 terminal request generation unit
400 image forming apparatus
401 control panel
402 recording medium I/F
403 controller
404 data communication I/F
406 scanner
407 plotter
411 interface device
413 drive device
417 image readout device
418 print device
420 device control unit
421 print execution unit
422 facsimile transmission/reception unit
423 manuscript readout unit
424 data storage control unit
425 mail transmission/reception unit
500 user

The invention claimed is:
1. An information processing system comprising:
a relay device;
a first information processing device; and
a second information processing device, the relay device and the first and second information processing devices being connected to different networks, wherein
the relay device includes first processing circuitry configured to:

receive a process request sent from a mobile terminal connected to the relay device, the process request indicating a first process that the first information processing device executes and a second process that the second information processing device executes based on an execution result of the first process;

send the process request to the first information processing device in response to a reception of a first request sent from the first information processing device; and send the execution result of the first process sent from the first information processing device and the process request to the second information processing device in response to a reception of a second request sent from the second information processing device, the first information processing device includes second processing circuitry configured to:

send the first request to the relay device;

receive the process request that is sent from the relay device in response to the reception of the first request;

control execution of the first process according to the process request; and send to the relay device the execution result of the first process, and the second information processing device includes third processing circuitry configured to:

send the second request to the relay device;

receive the process request and the execution result of the first process that are sent from the relay device in response to the reception of the second request; and control execution of the second process based on the execution result of the first process according to the process request.

2. The information processing system as claimed in claim 1, wherein the first processing circuitry of the relay device is further configured to:

receive from the mobile terminal device information for identifying an electronic device connected to the first information processing device, and the process request indicating the first process, which the first information processing device executes using the electronic device identified by the device information, and the second process; and send the device information and the process request to the first information processing device, and the second processing circuitry of the first information processing device is further configured to control the execution of the first process by using the electronic device identified by the device information according to the process request.

3. The information processing system as claimed in claim 2, wherein the electronic device is an image readout device that reads out an image or an image forming device being provided with a function of reading out an image, and the second processing circuitry of the first information processing device, when the first process indicated by the process request is a readout of an image, is further configured to:

cause the electronic device to execute the readout of the image;

acquire image data of the image; and send the acquired image data to the relay device as the execution result.

4. The information processing system as claimed in claim 1, wherein the first processing circuitry of the relay device is further configured to:

receive from the mobile terminal device information for identifying an electronic device connected to the second information processing device, and the process request indicating the first process and the second process, by which the second information processing device executes using the electronic device identified by the device information based on the execution result of the first process; and send the device information and the process request to the second information processing device, and the third processing circuitry of the second information processing device is further configured to control the execution of the second process based on the execution result of the first process by using the electronic device identified by the device information according to the process request.

5. The information processing system as claimed in claim 1, wherein the first processing circuitry of the relay device is further configured to:

receive from the mobile terminal a search request that requires searching for an electronic device connected the second information processing device; and send the search request to the second information processing device in response to the reception of the second request sent from the second information processing device, and the third processing circuitry of the second information processing device is further configured to:

receive the search request sent from the relay device;

search for device information of one or more electronic devices connected to the second information processing device in response to the search request; and send the searched device information to the mobile terminal via the relay device.

6. The information processing system as claimed in claim 1, wherein the second processing circuitry of the first information processing device is further configured to:

determine whether the second information processing device is directly accessible or not with reference to device information of the second information processing device included in the process request;

when the second information processing device is determined to be directly accessible, send directly to the second information processing device the execution result of the first process; and when the second information processing device is determined not to be directly accessible, send the execution result of the first process to the relay device.

7. An information processing system comprising:

a mobile terminal;

a first information processing device; and a second information processing device, the mobile terminal and the first and second information processing devices being connected to different networks, wherein the mobile terminal includes first processing circuitry configured to:

send to a relay device a process request indicating a first process that the first information processing device executes and a second process that the second information processing device executes based on an execution result of the first process, the first information processing device includes second processing circuitry configured to:
send a first request to the relay device;
receive the process request that is sent from the relay device in response to the reception of the first request;
control execution of the first process according to the process request; and
send to the relay device the execution result of the first process, and the second information processing device includes third processing circuitry configured to:
send a second request to the relay device;
receive the process request and the execution result of the first process that are sent from the relay device in response to the reception of the second request; and
control execution of the second process based on the execution result of the first process according to the process request.

8. The information processing system as claimed in claim 7, wherein
the first processing circuitry of the mobile terminal is configured to send, to the relay device, device information for identifying an electronic device connected to the first information processing device, and the process request indicating the first process, which the first information processing device executes using the electronic device identified by the device information, and the second process, and
the second processing circuitry of the first information processing device is configured to control the execution of the first process by using the electronic device identified by the device information according to the process request.

9. The information processing system as claimed in claim 7, wherein
the first processing circuitry of the mobile terminal is configured to send, to the relay device, device information for identifying an electronic device connected to the second information processing device, and the process request indicating the first process and the second process, which the second information processing device executes using the electronic device identified by the device information based on the execution result of the first process, and
the third processing circuitry of the second information processing device is configured to control the execution of the second process based on the execution result of the first process by using the electronic device identified by the device information according to the process request.

10. The information processing system as claimed in claim 8, wherein the first processing circuitry of the mobile terminal is configured to:
acquire, from the relay device, the device information for identifying the electronic device connected to the first information processing device; and
send, to the relay device, the device information and the process request indicating the first process, which the first information processing device executes using the electronic device identified by the device information, and the second process.

11. The information processing system as claimed in claim 7, wherein the first processing circuitry of the mobile terminal is configured to:
send, to the relay device, a search request that requires searching for an electronic device connected to the second information processing device;
receive device information of one or more electronic devices connected to the second information processing device provided by the relay device in response to the search request; and
send device information of one electronic device used for the second process among the searched device information of the one or more electronic devices connected to the second information processing device, and the process request indicating the first process and the second process, which the second information processing device executes using the one electronic device based on the execution result of the first process, and the third processing circuitry of the second information processing device is further configured to:
receive the search request sent from the relay device;
search for the device information of the one or more electronic devices connected to the second information processing device in response to the search request; and
send the device information of the one or more electronic devices to the mobile terminal via the relay device.

12. An information processing method for communicating between a relay device, a first information processing device, and a second information processing device, the relay device and the first and second information processing devices being connected to different networks, wherein the method comprises:
receiving by the relay device a process request sent from a mobile terminal connected to the relay device, the process request indicating a first process that the first information processing device executes and a second process that the second information processing device executes based on an execution result of the first process;
sending by the first information processing device a first request to the relay device;
sending by the relay device the process request to the first information processing device in response to a reception of the first request sent from the first information processing device;
controlling, by the first information processing device, execution of the first process according to the process request sent from the relay device;
sending the execution result of the first process to the relay device;
sending by the second information processing device a second request to the relay device;
sending by the relay device the execution result of the first process sent from the first information processing device and the process request to the second information processing device in response to a reception of the second request sent from the second information processing device; and
controlling, by the second information processing device, execution of the second process based on the execution result of the first process according to the process request sent from the relay device.

13. The information processing method as claimed in claim 12, further comprising:

receiving by the relay device from the mobile terminal device information for identifying an electronic device connected to the first information processing device, and the process request indicating the first process, by which the first information processing device executes using the electronic device identified by the device information, and the second process, sending by the relay device the received device information and the process request to the first information processing device; and controlling, by the first information processing device, execution of the first process by using the electronic device identified by the device information according to the process request.

14. The information processing method as claimed in claim 12, further comprising:

receiving by the relay device from the mobile terminal device information for identifying an electronic device connected to the second information processing device, and the process request indicating the first process and the second process, by which the second information processing device executes using the electronic device identified by the device information based on the execution result of the first process;

sending by the relay device the received device information and the process request to the second information processing device; and controlling, by the second information processing device, execution of the second process based on the execution result of the first process by using the electronic device identified by the device information according to the process request.

15. The information processing method as claimed in claim 12, further comprising:

determining by the first information processing device whether the second information processing device is directly accessible or not with reference to device information of the second information processing device included in the process request;

when the second information processing device is determined to be directly accessible by the first information processing device, sending directly by the first information processing device to the second information processing device the execution result of the first process; and when the second information processing device is determined not to be directly accessible by the first information processing device, sending by the first information processing device the execution result of the first process to the relay device.

* * * * *